(12) United States Patent
Herschke et al.

(10) Patent No.: US 11,613,638 B2
(45) Date of Patent: Mar. 28, 2023

(54) THREE-DIMENSIONAL PRINTING

(71) Applicant: Hewlett-Packard Development Company, L.P., Spring, TX (US)

(72) Inventors: Laurent Herschke, Sant Cugat del Valles (ES); Maria del Carmen Querol Esparch, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/045,847

(22) PCT Filed: May 17, 2018

(86) PCT No.: PCT/US2018/033103
§ 371 (c)(1),
(2) Date: Oct. 7, 2020

(87) PCT Pub. No.: WO2019/221733
PCT Pub. Date: Nov. 21, 2019

(65) Prior Publication Data
US 2021/0139685 A1 May 13, 2021

(51) Int. Cl.
*B29C 64/00* (2017.01)
*C08L 23/12* (2006.01)
(Continued)

(52) U.S. Cl.
CPC ........ *C08L 23/12* (2013.01); *B01D 67/00045* (2022.08); *B01D 67/00415* (2022.08); *B22F 10/00* (2021.01); *B22F 10/85* (2021.01); *B22F 12/00* (2021.01); *B22F 12/82* (2021.01); *B29C 64/00* (2017.08); *B29C 64/10* (2017.08); *B29C 64/165* (2017.08); *B29C 64/176* (2017.08); *B29C 64/182* (2017.08); *B29C 64/20* (2017.08); *B29C 64/205* (2017.08);
(Continued)

(58) Field of Classification Search
CPC ................................. C08L 23/12; B33Y 10/00
See application file for complete search history.

(56) References Cited

U.S. PATENT DOCUMENTS 4,407,986 A * 10/1983 Nomura .................. C08K 3/26
524/400
10,501,385 B1 * 12/2019 Buckner .................. F02K 9/10
(Continued)

FOREIGN PATENT DOCUMENTS

CN 103756236 4/2014
CN 106794629 A 5/2017
(Continued)

OTHER PUBLICATIONS https://repositories.lib.utexas.edu/bitstream/handle/2152/89636/067-Wegner.pdf?sequence=2 (Year: 2016).*
(Continued)

*Primary Examiner* — Nicholas R Krasnow
(74) *Attorney, Agent, or Firm* — HP Inc. Patent Department

(57) ABSTRACT

The present disclosure relates to a build material for 3D printing. The build material comprises polymeric particles comprising polypropylene and at least one elastomer. The polymeric particles comprise a surface-active coating.

7 Claims, 5 Drawing Sheets

(51) Int. Cl.

| | |
|---|---|
| *B33Y 10/00* | (2015.01) |
| *B33Y 70/00* | (2020.01) |
| *B29C 64/165* | (2017.01) |
| *C08L 53/00* | (2006.01) |
| *C08L 23/14* | (2006.01) |
| *B22F 12/82* | (2021.01) |
| *B33Y 80/00* | (2015.01) |
| *B29C 64/40* | (2017.01) |
| *B29C 64/386* | (2017.01) |
| *B22F 10/00* | (2021.01) |
| *B22F 10/85* | (2021.01) |
| *B29C 64/10* | (2017.01) |
| *B33Y 40/20* | (2020.01) |
| *B33Y 50/02* | (2015.01) |
| *B33Y 40/00* | (2020.01) |
| *B29C 64/307* | (2017.01) |
| *B29C 64/393* | (2017.01) |
| *B29C 64/30* | (2017.01) |
| *B33Y 50/00* | (2015.01) |
| *B29C 64/227* | (2017.01) |
| *B22F 12/00* | (2021.01) |
| *B29C 64/255* | (2017.01) |
| *B29C 64/182* | (2017.01) |
| *B33Y 40/10* | (2020.01) |
| *B29C 64/176* | (2017.01) |
| *B33Y 99/00* | (2015.01) |
| *B29C 64/20* | (2017.01) |
| *B29C 64/245* | (2017.01) |
| *B29C 64/25* | (2017.01) |
| *B01D 67/00* | (2006.01) |
| *B33Y 30/00* | (2015.01) |
| *B29C 64/205* | (2017.01) |
| *B29K 21/00* | (2006.01) |
| *B29K 23/00* | (2006.01) |
| *B29K 105/00* | (2006.01) |
| *B33Y 70/10* | (2020.01) |

(52) U.S. Cl.
CPC .......... *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/386* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12); *C08L 23/14* (2013.01); *C08L 53/00* (2013.01); *B29K 2021/003* (2013.01); *B29K 2023/12* (2013.01); *B29K 2023/16* (2013.01); *B29K 2105/251* (2013.01); *B33Y 70/10* (2020.01); *C08L 2205/14* (2013.01); *G03G 2215/2054* (2013.01); *G05B 2219/49023* (2013.01); *G05B 2219/49246* (2013.01); *Y10T 156/1722* (2015.01); *Y10T 156/1798* (2015.01)

(56) References Cited

U.S. PATENT DOCUMENTS

| | | |
|---|---|---|
| 2004/0056378 A1 | 3/2004 | Bredt et al. |
| 2005/0003189 A1* | 1/2005 | Bredt ............... B33Y 70/10 |
| | | 428/402 |
| 2007/0241482 A1* | 10/2007 | Giller ............... B29C 64/165 |
| | | 264/494 |
| 2008/0018018 A1* | 1/2008 | Nielsen ............. B29C 64/165 |
| | | 425/375 |
| 2015/0367415 A1 | 12/2015 | Buller et al. |
| 2016/0185050 A1 | 6/2016 | Topolkaraev et al. |
| 2018/0056584 A1* | 3/2018 | Wittner ............. B33Y 70/00 |

FOREIGN PATENT DOCUMENTS

| | | |
|---|---|---|
| CN | 107073825 A | 8/2017 |
| EP | 1226019 B1 | 3/2004 |
| JP | 2005-533877 | 11/2005 |
| JP | 2007030467 | 2/2007 |
| JP | 2016-187918 A | 11/2016 |
| JP | 2019-509358 A | 4/2019 |
| WO | WO-2007114895 | 10/2007 |
| WO | WO2007/114895 | * 12/2007 |
| WO | WO-2016/053305 | 4/2016 |
| WO | 2017/188961 A1 | 11/2017 |
| WO | WO-2018022034 | 2/2018 |

OTHER PUBLICATIONS

Banerjee et al., "3D-Printable PP/SEBS Thermoplastic Elastomeric Blends: Preparation and Properties", Polymers 2019. vol. 11, No. 347, 13 pages.

Haigh et al, "Additive manufacturing with polypropylene microfibers"; Materials Science and Engineering C 77, 2017, pp. 883-887.

Hou et al, Fabricating 3D printable BIIR/PP TPV via masterbatch and interfacial compatibilization Composites Part B 199, 2020, 9 pages.

Phinyocheep et al, "Influence of Compatibilizers on Mechnical Properties, Crystallization, and Morphology of Polypropylene/ Scrap Rubber Dust Blends", Journal of Applied Polymer Science, vol. 86, 2002. pp. 148-159.

Prut et al, "Effects of blend composition and dynamic vulcanization on the morphology and dynamic viscoelastic properties of PP/EPDM blends", Journal of Applied Polymer Science, vol. 109, Issue 2, pp. 1212-1220, Apr. 2008.

Thitithammawong et al, "Influence of Compatibilizers on the Rheological, Mechanical, and Morphological Properties of Epoxidized Natural Rubber/Polypropylene Thermoplastic Vulcanizates", Journal or Applied Polymer Science, vol. 107, 2008, pp. 2436-2443.

\* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike other machining processes, which can often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
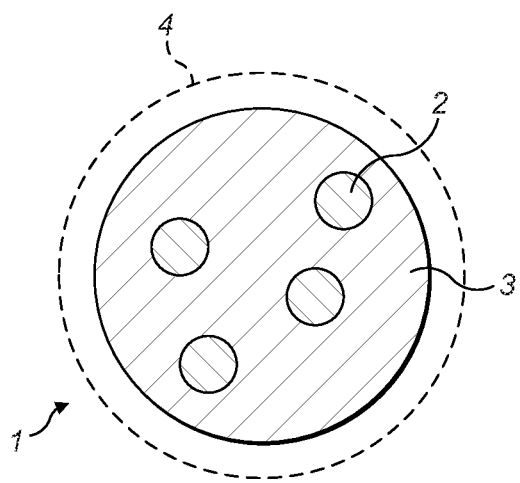
FIG. 1*a* is a schematic diagram of an example of a composite particle.

Some examples of three-dimensional (3D) printing may utilize a fusing agent (including a radiation absorber) to pattern build material comprising polymeric particles. In these examples, an entire layer of the build material may be exposed to radiation, but the patterned region (which, in some instances, is less than the entire layer) of the build material is fused/coalesced and hardened to become a layer of a 3D part.

In the patterned region, the fusing agent may be capable of at least partially penetrating voids between the polymeric particles of the build material. The fusing agent may also be capable of spreading onto the exterior surface of the polymeric particles of the build material. This fusing agent may absorb radiation and convert the absorbed radiation to thermal energy, which in turn fuses/coalesces the build material that is in contact with the fusing agent. Fusing/coalescing causes the polymeric particles of the build material to join bind or blend to form a single entity (e.g. the layer of the 3D part). Fusing/coalescing may involve at least partial thermal merging, melting, binding, and/or some other mechanism that coalesces the polymeric particles of the build material to form the layer of the 3D part.

As used herein, a "kit" may comprise one or more components where the different components are contained in one or more containers, separately or in any combination, prior to and during printing but these components can be combined together during printing. The containers can be any type of a vessel, box, or receptacle made of any material.

As used herein, "(s)" at the end of some terms indicates that those terms/phrases may be singular in some examples or plural in some examples. It is to be understood that the terms without "(s)" may be also be used singularly or plurally in many examples.

According to a first aspect of the present disclosure, there is provided a build material for 3D printing. The build material comprises polymeric particles comprising polypropylene and at least one elastomer. The polymeric particles comprise a surface-active coating.

According to a further aspect of the present disclosure, there is provided a build material for 3D printing. The build material comprises composite polymeric particles comprising particles of at least one elastomer dispersed in a matrix comprising polypropylene. The elastomer is present in an amount of about 3 to about 50 weight % based on the total weight of the composite polymeric particles and the polypropylene comprises a block copolymer of propylene and comonomer selected from a $C_2$ or $C_{4-8}$ olefin.

In yet a further aspect, there is provided a three-dimensional printing kit comprising I) a fusing agent comprising at least one infrared absorbing compound, and II) a build material for 3D printing, said build material comprising a) polymeric particles comprising polypropylene and at least one elastomer, wherein the polymeric particles comprise a surface-active coating and/or b) polymeric composite particles comprising particles of at least one elastomer dispersed in a matrix comprising polypropylene, wherein the elastomer is present in an amount of about 3 to about 50 weight % based on the total weight of the composite polymeric particles, and wherein the polypropylene comprises a block copolymer of propylene and comonomer selected from a $C_2$ or $C_{4-8}$ olefin.

In some examples, the kit may further comprise a detailing agent.

In another aspect, there is provided a method for three-dimensional printing. The method comprises depositing a layer of build material on a build platform. The build material comprises a) polymeric particles comprising polypropylene and at least one elastomer, wherein the polymeric particles comprise a surface-active coating and/or b) polymeric composite particles comprising particles of at least one elastomer dispersed in a matrix comprising polypropylene, wherein the elastomer is present in an amount of about 3 to about 50 weight % based on the total weight of the composite polymeric particles, and wherein the polypropylene comprises a block copolymer of propylene and comonomer selected from a $C_2$ or $C_{4-8}$ olefin. Based on a 3D object model, a fusing agent is selectively applied onto at least a portion of the layer of the build material. The build material is then heated to at least partially bind the portion of the build material.

In some examples, the method for three-dimensional printing may be employed to print an automotive part.

It has been found that, for certain applications, it can be difficult to produce 3D printed parts from commercially available build materials. For example, for certain applications, it can be difficult to achieve the desired combination of, for example, stiffness, impact strength and/or flexural modulus. Although plasticizers may be added to increase flexibility of a polymeric material, plasticizers may leach out of the material over time. This may be undesirable, for instance, for food applications. This may also have a negative impact on the long-term properties of the material.

In the present disclosure, a build material for 3D printing has been developed. The build material comprises polymeric particles comprising polypropylene and at least one elastomer. The polymeric particles comprise a surface-active coating. The polymeric particles of the build material may comprise a physical mixture of polypropylene particles and elastomer particles. Alternatively or additionally, the polymeric particles may be composite polymeric particles comprising the polypropylene and the at least one elastomer.

By blending the elastomer and the polypropylene in this manner, the properties of the build material may be adjusted so that the printed part may have a combination of desired properties. For example, by mixing the elastomer and polypropylene, it may be possible to produce a 3D printed part with desired stiffness, impact strength and/or flexibility for, for example, automotive applications. Furthermore, the surface-active coating may improve surface contact between the polymeric particles and fusing agent applied during 3D printing, allowing the 3D printed parts to be printed more effectively.

Where the polymeric particles of the build material comprise a physical mixture of (i) polypropylene particles and (ii) particles comprising the at least one elastomer, each of the (i) polypropylene particles and (ii) particles comprising the at least one elastomer may comprise a surface-active coating. In some examples, the same surface-active coating is applied to the (i) polypropylene particles and (ii) particles comprising the at least one elastomer. In other examples, the (i) polypropylene particles may comprise a surface-active coating that is different from the surface-active coating on the (ii) particles comprising the at least one elastomer. By adequately mixing the polypropylene particles and elastomer particles, for example, by dry blending, a uniform mixture may be produced. As a result, the build material may be used to produce a 3D printed part having uniform properties.

Where the polymeric particles of the build material comprise composite polymeric particles comprising the polypropylene and the at least one elastomer, the composite particles may comprise polypropylene particles and elastomer particles. Alternatively, the composite polymeric particles may comprise particles of the at least one elastomer dispersed in a matrix of the polypropylene. The elastomer particles may be considered as "islands" dispersed in a "sea" of polypropylene. In yet a further alternative, the composite particles may comprise polypropylene particles dispersed in a matrix of elastomer. Thus, in this example, the polypropylene particles may be considered as "islands" dispersed in a sea of elastomer. By forming composite particles, it may be possible to evenly distribute polypropylene and elastomer throughout the build material. As a result, the build material may be used to produce a 3D printed part having uniform properties.

Polymeric Particles

The polymeric particles of the build material may have the following particle size distribution (by volume): D10: about 20 μm-about 45 μm; D50: about 50 μm-about 85 μm; and D90: about 90 μm-about 140 μm. In some examples, D10 can be about 15 μm-about 50 μm, or about 20 μm-about 45 μm, or about 25 μm-about 40 μm, or about 30 μm-about 35 μm. In some examples, D50 can be about 50 μm-about 85 μm, or about 55 μm-about 80 μm, or about 60 μm-about 75 μm, or about 60 μm-about 70 μm, or about 50 μm-about 65 μm. In some examples, D90 can be about 85 μm-about 130 μm, or about 90 μm-about 125 μm, or about 95 μm-about 120 μm, or about 110 μm-about 115 μm.

In some examples, the fines content (less than 30 μm) of polymeric particles may be less than about 10 volume %, for example, less than about 8 volume % or less than about 6 volume %. In some examples, the fines content may be less than about 5 volume %, for example, less than about 4 volume % or less than about 2 volume %. Fines content may be determined according to ISO 8130/13 as measured on the dry polymeric particles.

Where the polymeric particles comprise a mixture of polypropylene particles and elastomer particles, the mixture may have the following particle size distribution (by volume): D10: about 20 μm-about 45 μm; D50: about 50 μm-about 85 μm; and D90: about 90 μm-about 140 μm. In some examples, D10 can be about 15 μm-about 50 μm, or about 20 μm-about 45 μm, or about 25 μm-about 40 μm, or about 30 μm-about 35 μm. In some examples, D50 can be about 50 μm-about 85 μm, or about 55 μm-about 80 μm, or about 60 μm-about 75 μm, or about 60 μm-about 70 μm, or about 50 μm-about 65 μm. In some examples, D90 can be about 85 μm-about 130 μm, or about 90 μm-about 125 μm, or about 95 μm-about 120 μm, or about 110 μm-about 115 μm.

The fines content (less than 30 μm) of the mixture of particles may be less than about 10 volume %, for example, less than about 8 volume % or less than about 6 volume %. In some examples, the fines content may be less than about 5 volume %, for example, less than about 4 volume % or less than about 2 volume %. Fines content may be determined according to ISO 8130/13 as measured on the dry particle mixture.

Where the polymeric particles are composite particles comprising the polypropylene and elastomer, the composite particles may have the following particle size distribution (by volume): D10: about 20 μm-about 45 μm; D50: about 50 μm-about 85 μm; and D90: about 90 μm-about 140 μm. In some examples, D10 can be about 15 μm-about 50 μm, or about 20 μm-about 45 μm, or about 25 μm-about 40 μm, or about 30 μm-about 35 μm. In some examples, D50 can be about 50 μm-about 85 μm, or about 55 μm-about 80 μm, or about 60 μm-about 75 μm, or about 60 μm-about 70 μm, or about 50 μm-about 65 μm. In some examples, D90 can be about 85 μm-about 130 μm, or about 90 μm-about 125 μm, or about 95 μm-about 120 μm, or about 110 μm-about 115 μm.

The fines content (less than 30 μm) of the composite particles may be less than about 10 volume %, for example, less than about 8 volume % or less than about 6 volume %. In some examples, the fines content may be less than about 5 volume %, for example, less than about 4 volume % or less than about 2 volume %. Fines content may be determined according to ISO 8130/13 as measured on the dry composite particles.

The build material may be made up of similarly sized particles or differently sized particles. The term "size" or "particle size," as used herein, refers to the diameter of a substantially spherical particle, or the average diameter of a non-spherical particle (i.e., the average of multiple diameters across the particle), or the effective diameter of a non-spherical particle (i.e., the diameter of a sphere with the same mass and density as the non-spherical particle). A substantially spherical particle (i.e., spherical or near-spherical) has a sphericity of >0.84. Thus, any individual particles having a sphericity of <0.84 are considered non-spherical (irregularly shaped).

The polymeric particles may be formed of a material having a material density of at least about 0.85 g/cm$^3$, for example, at least about 0.87 g/cm$^3$. In some examples, the material density may be at most about 1.5 g/cm$^3$, for example, at most about 1.4 g/cm$^3$. In some examples, material density may be about 0.85 to about 1.5 g/cm$^3$, for example, about 0.87 to about 1.4 g/cm$^3$. In some examples, the material density may be about 0.9 to about 1.3 g/cm$^3$, for example, about 0.91 to about 1.2 g/cm$^3$, for instance, about 0.91 to about 1.19 g/cm$^3$ or 1.00 g/cm$^3$. Material density may be measured according to ISO 1183, 23 degrees C.

Where the polymeric particles comprise a mixture of polypropylene particles and elastomer particles, the material density of the mixture may be at least about 0.85 g/cm$^3$, for example, at least about 0.87 g/cm$^3$. In some examples, the material density may be at most about 1.5 g/cm$^3$, for example, at most about 1.4 g/cm$^3$. In some examples, the material density may be about 0.85 to about 1.5 g/cm$^3$, for example, about 0.87 to about 1.4 g/cm$^3$. In some examples, the material density may be about 0.9 to about 1.3 g/cm$^3$, for example, about 0.91 to about 1.2 g/cm$^3$, for instance, 0.91 to 1.19 g/cm$^3$ or 1.00 g/cm$^3$. Material density may be measured according to ISO 1183, 23 degrees C.

Where the polymeric particles are composite particles comprising the polypropylene and elastomer, the composite particles may have a material density of at most about 1.5 g/cm$^3$, for example, at most about 1.4 g/cm$^3$. In some examples, the material density may be at most about 1.5 g/cm$^3$, for example, at most about 1.4 g/cm$^3$. In some examples, the material density may be about 0.85 to about 1.5 g/cm$^3$, for example, about 0.87 to about 1.4 g/cm$^3$. In some examples, the material density may be about 0.9 to about 1.3 g/cm$^3$, for example, about 0.91 to about 1.2 g/cm$^3$, for instance, 0.91 to 1.19 g/cm$^3$ or 1.00 g/cm$^3$. Material density may be measured according to ISO 1183, 23 degrees C.

The polymeric particles may be formed of a material having a melt flow rate, as measured according to ISO 1133, 230 degrees C., 2.16 kg, of at least about 8 g/10 min, for example, at least about 9 g/10 min. The melt flow rate may be at most about 18 g/10 min, for example, at most about 16 g/10 min. In some examples, the melt flow rate may be about 8 to about 18 g/10 min, for instance, about 9 to about 16 g/10 min. In some examples, the melt flow rate may be about 9 to about 14 g/10 min, for instance, about 10 to about 12 g/10 min.

Where the polymeric particles comprise a mixture of polypropylene particles and elastomer particles, the melt flow rate of the material of the mixture (ISO 1133, 230 degrees C., 2.16 kg) may be at least about 8 g/10 min, for example, at least about 9 g/10 min. The melt flow rate may be at most about 18 g/10 min, for example, at most about 16 g/10 min. In some examples, the melt flow rate may be about 8 to about 18 g/10 min, for instance, about 9 to about 16 g/10 min. In some examples, the melt flow rate may be about 9 to about 14 g/10 min, for instance, about 10 to about 12 g/10 min.

Where the polymeric particles are composite particles comprising the polypropylene and elastomer, the melt flow rate of the material of the composite (ISO 1133, 230 degrees C., 2.16 kg) may be at least about 8 g/10 min, for example, at least about 9 g/10 min. The melt flow rate may be at most about 18 g/10 min, for example, at most about 16 g/10 min. In some examples, the melt flow rate may be about 8 to about 18 g/10 min, for instance, about 9 to about 16 g/10 min. In some examples, the melt flow rate may be about 9 to about 14 g/10 min, for instance, about 10 to about 12 g/10 min.

The polymeric particles may be formed of a material having a coefficient of linear thermal expansion (ISO11359-2 TMA) of less than 160, for example, 150 or less, 100 or less or 80 or less micron/mm·K.

The polymeric particles may be formed of a material having a moisture content (ISO15512) of less than 1, for example, less than 0.7 weight %.

In some examples, the polymeric particles may be formed of a material that has a melt flow rate of about 9 to about 14 g/10 min, for instance, about 10 to about 12 g/10 min, and a material density of about 0.9 to about 1.3 g/cm$^3$, for example, about 0.91 to about 1.2 g/cm$^3$, for instance, about 0.91 to about 1.19 g/cm$^3$. In some examples, the polymeric particles may be formed of a material that has a melt flow rate of about 10 to about 12 g/10 min and a material density of about 0.91 to about 1.00 g/cm$^3$.

In some examples where the polymeric particles are composite particles, the composite particles may be formed of a material that has a melt flow rate of about 9 to about 14 g/10 min, for instance, about 10 to about 12 g/10 min, and a material density of about 0.9 to about 1.3 g/cm$^3$, for example, about 0.91 to about 1.2 g/cm$^3$, for instance, about 0.91 to about 1.19 g/cm$^3$. In some examples, the composite particles may be formed of a material that has a melt flow rate of about 10 to about 12 g/10 min and a material density of about 0.91 to about 1.00 g/cm$^3$.

In some examples where the polymeric particles are a mixture of particles, the mixture has a melt flow rate of about 9 to about 14 g/10 min, for instance, about 10 to about 12 g/10 min, and a material density of about 0.9 to about 1.3 g/cm$^3$, for example, about 0.91 to about 1.2 g/cm$^3$, for instance, about 0.91 to about 1.19 g/cm$^3$. In some examples, the mixture has a melt flow rate of about 10 to about 12 g/10 min and a material density of about 0.91 to about 1.00 g/cm$^3$.

The polymeric particles may be any suitable shape. For example, the polymeric particles may be formed of a powder. The powder may include substantially spherical or irregularly shaped particles. In some examples, the particles may include fibers e.g. short fibers cut from longer strands or threads of material.

Polypropylene

As mentioned above, the build material comprises polymeric particles comprising polypropylene. The polypropylene may be a propylene homopolymer, a propylene copolymer, a propylene terpolymer, or combinations thereof. In some examples, the polypropylene may be a copolymer of propylene and a comonomer selected from a $C_2$ or $C_{4-8}$ olefin.

Examples of suitable comonomers may be ethylene, 1-butene, 1-pentene, 1-hexene, 1-octene, 4-methy-1-pentene, butadiene, and blends thereof. In some examples, the comonomer may be selected from at least one ethylene, 1-hexene and butadiene.

Examples of the copolymer include random or block copolymers. Examples include ethylene-propylene random copolymer, ethylene-propylene alternate copolymer, ethylene-propylene block copolymer, ethylene-propylene-butene terpolymer, ethylene-propylene-pentene terpolymer, ethylene-propylene-octene terpolymer, ethylene-propylene-4-methyl-1-pentene terpolymer, physical blends of these polymers produced by compounding and/or dry blending. In some examples, the copolymer may be a block copolymer of propylene and a comonomer selected from at least one of ethylene, 1-hexene and butadiene.

In some examples, the polypropylene may be a copolymer of propylene and a comonomer. The comonomer may be as outlined above. In some examples, the commoner may be selected from at least one of ethylene, 1-hexene and butadiene. The comonomer content may be at least about 1 weight %, for example, at least about 3 weight % or at least about 5 weight %. The comonomer content may be at most about 70 weight %, for example, at most about 50 weight % or at most about 30 weight %. The comonomer content may be about 1 to about 70 weight %, for example, about 3 to about 50 weight % or about 5 to about 30 weight %. In some examples, the comonomer content may be about 8 to about 20 weight % or about 10 to about 15 weight %.

The polypropylene may have an average molecular weight in number (Mn) between about 55,000 g/mol and about 65,000 g/mol, average molecular weight in mass (Mw) between about 280,000 g/mol and about 325,000 g/mol, and a polydispersity (PDI=Mw/Mn) of about 4 to about 7, for instance, about 5.

The polypropylene may be formed using any suitable polymerization catalyst. Examples of the polymerization catalyst include a Ziegler-based solid catalyst obtained by subjecting a solid catalyst component containing titanium, magnesium, a halogen and electron donor, an organic aluminum compound component, and an electron donor component in contact with each other; and a metallocene-based solid catalyst obtained by supporting a metallocene compound and a co-catalyst component on a particulate carrier. These catalysts may be used in combination.

In some examples, a chain-transfer agent such as hydrogen may also be used in combination to adjust the molecular weight of the polymer.

The polypropylene can have a melting peak temperature of between about 130° C. and about 140° C., or between about 110° C. and about 150° C., or between about 120° C. and about 130° C., or between about 131° C. and about 139° C., or between about 132° C. and about 138° C., or between about 133° C. and about 137° C., or between about 134° C. and about 136° C., or about 135° C.

The polypropylene can have a crystallization peak temperature of between about 98° C. and about 105° C., or between about 90° C. and about 110° C., or between about 91° C. and about 109° C., or between about 92° C. and about 108° C., or between about 93° C. and about 107° C., or between about 94° C. and about 106° C., or between about 95° C. and about 105° C., or between about 96° C. and about 104° C., or between about 97° C. and about 103° C., or between about 98° C. and about 102° C., between about 99° C. and about 101° C., or about 100° C.

The polypropylene can have a melt flow index of at least about 4 g/10 min at about 190° C., or at least about 5 g/10 min at about 190° C., or at least about 6 g/10 min at about 190° C., or at least about 7 g/10 min at about 190° C., or at least about 8 g/10 min at about 190° C., or at least about 9 g/10 min at about 190° C., or at least about 10 g/10 min at about 190° C., or from about 3 g/10 min or to about 11 g/10 min at about 190° C., or from about 4 g/10 min or to about 10 g/10 min at about 190° C., or from about 5 g/10 min or to about 9 g/10 min at about 190° C., or from about 6 g/10 min or to about 8 g/10 min at about 190° C., or about 7 g/10 min at about 190° C. Melt flow index may be determined by ISO 1133 at 230 degrees C., 2.16 kg.

The polypropylene can have a zero-shear melt viscosity at 190° C. (measured in plate-plate geometry at 0.001 Hz) between about 300 Pa·s and about 8000 Pa·s and, for example, between about 3000 Pa·s and about 7000 Pa·s.

Where the build material comprises a mixture of polypropylene particles and elastomer particles, the polypropylene particles may have the following particle size distribution (by volume): D10: about 20 μm-about 45 μm; D50: about 50 μm-about 85 μm; and D90: about 90 μm-about 140 μm. In some examples, D10 can be about 15 μm-about 50 μm, or about 20 μm-about 45 μm, or about 25 μm-about 40 μm, or about 30 μm-about 35 μm. In some examples, D50 can be about 50 μm-about 85 μm, or about 55 μm-about 80 μm, or about 60 μm-about 75 μm, or about 60 μm-about 70 μm, or about 50 μm-about 65 μm. In some examples, D90 can be about 85 μm-about 130 μm, or about 90 μm-about 125 μm, or about 95 μm-about 120 μm, or about 110 μm-about 115 μm.

Polypropylene may be present in an amount of at least about 40 weight %, for example, at least about 50 weight %, at least about 60 weight % of the total weight of the build material. In some examples, polypropylene may be present in an amount of at most 99 weight %, for example, at most 95 weight % or 90 weight % of the total weight of the build material. In some examples, polypropylene may be present in an amount of about 40 to about 99 weight %, for example, about 50 to about 95 weight % or about 60 to about 90 weight % of the total weight of the build material.

Elastomer

As mentioned above, the build material comprises polymeric particles comprising elastomer. Any suitable elastomer may be employed. For example, thermoplastic elastomers may be employed.

Examples include olefinic elastomers, for example, ethylene propylene rubber (EPR) elastomer. A skeletal formula of an example of an EPR elastomer is shown below:

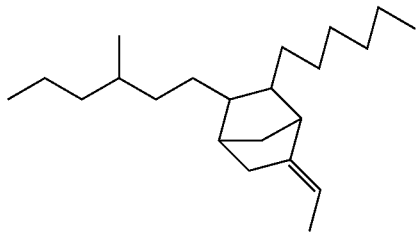 [SMILES: C/C=C1\CC2CC1C(CCCCCC)C2CCC(C)CCC]

In another example, ethylene propylene diene monomer (EPDM) may be employed. EPDM is a copolymer of ethylene, propylene and a small amount of non-conjugated diene monomers (e.g. 3-9 percent). The diene monomers may provide cross-linking sites for vulcanization.

Examples of suitable dienes may be dicyclopentadiene, ethylidene nobornene, or 1,4 hexadiene. Suitable manufacturers and suppliers of EPDM rubbers include Dow Chemical, ExxonMobil, and Lion Elastomers.

Other examples include styrenic elastomers. One example may be styrene-butadiene rubber (SBR). SBR is a random copolymer of butadiene and styrene. The styrene may be present in an amount of about 10 to about 25 percent by weight of the copolymer. Manufacturers of SBR rubbers include Firestone, Dynasol, Eni, Asahi-Kasei, LG Chem, GoodYear, JSR, and Lanxess.

In some examples, styrenic block copolymers are employed as the elastomer. Examples of such copolymers may be produced by the copolymerisation of styrene and butadiene (SBS) or of styrene and 2-methyl-1,3-butadiene (SIS). Another example may be styrene-ethylene-butadiene-styrene rubber (SEBS). Manufacturers of such styrenic block copolymers include Firestone, GoodYear, Kraton and Lanxess and of SIS Zeon, and JSR.

In some examples, the elastomer may be a urethane elastomer. Polyether urethanes, polyester urethanes and polyurea elastomers may be employed.

In some examples, the elastomer may be a natural or synthetic polyisoprene rubber (NR, IR), a chlorosulfonated ethylene (CSM), an acrylic rubber (ABR), a nitrile rubber (NBR), an halogenated butyl rubber, chloroprene, a polyether block amide (PEBA, TPA), a fluoroelastomer (FKM), a perfluoroelastomer (FFKM), a silicone elastomer.

Elastomer may be present in an amount of at least about 1 weight %, for example, at least about 2 weight %, at least about 5 weight % of the total weight of the build material. In some examples, elastomer may be present in an amount of at most 60 weight %, for example, at most 50 weight % or 40 weight % of the total weight of the build material. In some examples, polypropylene may be present in an amount of about 1 to about 60 weight %, for example, about 2 to about 50 weight % or about 5 to about 40 weight % of the total weight of the build material.

Composite Particles

As mentioned above, the polymeric particles may be composite polymeric particles comprising the polypropylene and the at least one elastomer. The composite particles may comprise polypropylene particles and elastomer particles. Alternatively, the composite polymeric particles may comprise particles of the at least one elastomer dispersed in a matrix of the polypropylene. The elastomer particles may be considered as "islands" dispersed in a "sea" of polypropylene. In yet a further alternative, the composite particles may comprise polypropylene particles dispersed in a matrix of elastomer. Thus, in this example, the polypropylene particles may be considered as "islands" dispersed in a sea of elastomer. By forming composite particles, it may be possible to evenly distribute polypropylene and elastomer throughout the build material. As a result, the build material may be used to produce a 3D printed part having uniform properties.

Composite particles may be produced using any suitable method. For example, where the elastomer has a higher melting temperature than the polypropylene, the elastomer particles may be dispersed in molten polypropylene. By dispersing elastomeric particles in the polypropylene melt, the particles can become encapsulated in the polypropylene. Thus, elastomer particles can be dispersed in a matrix of polypropylene. The resulting mixture may then be formed into pellets by extrusion and then ground into particles. Alternatively, molten polymer may be dispersed in an aqueous medium e.g. in an extruder e.g. at a temperature above 100 degrees C. The pressure in the extruder may be maintained above atmospheric pressure to prevent the aqueous medium from boiling. The resulting polymer particles may then be isolated by techniques, for example, filtering, spray drying, freeze drying, centrifuging or decanting and oven drying.

The composite particles may be provided with a surface-active coating.

Other methods of making composite particles include a two-stage polymerization process (gas-liquid or liquid-liquid) of olefin comonomer (e.g. ethylene) and propylene mixtures with ethylene comonomer content varying from about 5 mol % to about 20 mol %, using e.g. ethylbenzoate and/or succinate-based Ziegler-Natta catalysts and the Spheripol™ process from LyondellBasell Industries.

FIG. 1a is a schematic diagram of an example of a composite particle. The particle 1 comprises elastomer particles 2 dispersed in a matrix or "sea" of polypropylene 3. The composite particle 1 comprises a surface-active coating 4.

Mixture of Particles

As mentioned above, the polymeric particles of the build material may comprise a physical mixture of (i) polypropylene particles and (ii) particles comprising the at least one elastomer. In such a mixture, each of the (i) polypropylene particles and (ii) particles comprising the at least one elastomer may comprise a surface-active coating. In some examples, the same surface-active coating is applied to the (i) polypropylene particles and (ii) particles comprising the at least one elastomer. In other examples, the (i) polypropylene particles may comprise a surface-active coating that is different from the surface-active coating on the (ii) particles comprising the at least one elastomer. By adequately mixing the polypropylene particles and elastomer particles, for example, by dry blending, a uniform mixture may be produced. As a result, the build material may be used to produce a 3D printed part having uniform properties.

The mixture of particles may be formed by any suitable method. For example, polypropylene particles may be blended, for example, dry blended with particles of elastomer. In one example, polypropylene particles may be formed by grinding polypropylene pellets. Similarly, elastomer particles may be formed by grinding elastomer pellets.

The polypropylene particles and elastomer particles may be coated with a surface-active coating.

Figure 1B:
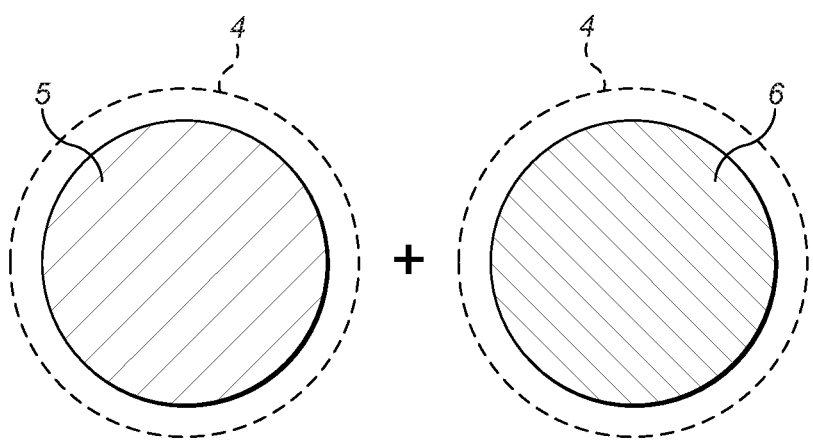
FIG. 1*b* is a schematic diagram of a polypropylene particle and an example of an elastomer particle.

FIG. 1b is a schematic drawing of an example of a polypropylene particle 5 and an example of an elastomer particle 6, which may be present in a physical mixture of polypropylene particles and elastomer particles. Each of the particles 5, 6 is provided with a surface-active coating 4.

Surface-Active Coating

Any suitable surface-active coating may be employed on the polymeric particles. Examples include coatings comprising surfactants or acidic polymers and their salts. Blends of surfactants and/or acidic polymers may also be employed. Examples of suitable surfactants include anionic, non-ionic and cationic surfactants. A suitable anionic surfactant may be sodium lauryl sulphate. Alkylbenzene sulphonates may also be employed, including linear and branched alkyl benzene sulphonates.

Some examples of non-ionic surfactants include a self-emulsifiable, non-ionic wetting agent based on acetylenic diol chemistry (e.g., SURFYNOL® SEF from Evonik Resources Efficiency GmbH), a non-ionic fluorosurfactant (e.g., CAPSTONE® fluorosurfactants from DuPont, previously referred as ZONYL FSO), and combinations thereof. In other examples, the wetting agent is an ethoxylated low-foam wetting agent (e.g., SURFYNOL® 440 or SURFYNOL® CT-111 from Evonik Resources Efficiency GmbH) or an ethoxylated wetting agent and molecular defoamer (e.g., SURFYNOL® 420 from Evonik Resources Efficiency GmbH). Still other suitable wetting agents include non-ionic wetting agents and molecular defoamers (e.g., SURFYNOL® 104E from Evonik Resources Efficiency GmbH) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be appropriate to utilize a wetting agent having a hydrophilic-lipophilic balance (HLB) less than 10.

Another example may be ethylene oxide/propylene oxide copolymers. Other examples include polyethylene glycol or polypropylene glycol with degree of polymerization comprised between 100 and 6000, and alkylphenyl(ethyleneoxy) ethanol with degree of ethoxylation between 8 and 11.

Other examples include styryl phosphonic acids and alkyl phosphonic acids The alkyl group may comprise 5 to 20 carbon atoms. In some examples, the alkyl phosphonic acid may be of the formula:

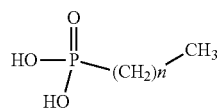

where n is an integer from 5-17.

Other examples include polyacrylic acid, polymethacrylic acid, polystyrene sulfonic acid, polystyrene-polyacrylic block copolymers and salts thereof.

In other examples it is appropriate to use mixtures of wetting agents and dispersants, with resulting HLB between 8 and 16, and, for example, between 8 and 12. Examples of dispersants include but not limited to monoester and diester sulfosuccinates, polyoxyethylene (20) sorbitan tristearate, polyoxyethylene (20) sorbitan trioleate.

Furthermore the surface-active coating may be an inorganic particulate coating, e.g. comprising fumed metal oxide nanoparticles. Examples include but are not limited to silicone oxide e.g. AEROSIL® 200, aluminum oxide e.g. AEROXIDE® Alu C and aqueous dispersions thereof e.g. AERODISP® W1824, AERODISP® W440 from Evonik Resources Efficiency GmbH.

The coating may be applied using a suitable method. Examples include spray coating, pan coating, air or gas suspension coating, liquid bed coating, liquid dispersion coating or dipping. In some examples, the coating may be applied and subsequently polymerized.

In one example, polymeric pellets may be milled, for instance, cryogenically. The particles may then be spray-coated with a surfactant solution or acidic polymer solution.

In one example, polymeric particles e.g. in pellet form may be cryogenically milled. Milling may be performed, for example, using a 5 m long paddle screw cooler from Messer Group GmbH connected to a counter-rotating pin milling system Contraplex CW250 from Hosokawa Alpine AG running at 6.000 rpm, −25° C., with a feed rate of 15 kg/h. The cryogenic milling line may be equipped with a 4 m long thermally insulated stainless pipe connecting the Contraplex CW250 mill with an inline 1.2 m wide 2 screen (120 micron and 90 micron) vibration sieve Vibration-Round-Screener VRS with ultrasonic cleaning device of Allgaier Process Technology GmbH. A wetting agent may be sprayed onto the milled particles. For example, through a homogenizing S-type valve from GEA Group AG operating at 5 bar pressure and located between the exhaust of Contraplex CW250 and the connection pipe, a wetting agent solution may be sprayed to coat the surface of the produced particles. The wetting agent solution is in one example may be 100 wt % SURFYNOL® I 104E and in a second example may be 1 wt % aqueous solution of SURFYNOL® 440 from Evonik Resources Efficiency GmbH in de-ionized water.

In another example, polymeric particles may be produced in powder form by cryogenic milling using a 5 m long paddle screw cooler from Messer Group GmbH connected to a counter-rotating pin milling system Contraplex CW250 with from Hosokawa Alpine AG running at 6.000 rpm, −25° C., with a feed rate of 15 kg/h and with an inline 1.2 m wide 2 screen (120 micron and 90 micron) vibration sieve Vibration-Round-Screener VRS with ultrasonic cleaning device of Allgaier Process Technology GmbH. The particles may be coated batchwise by spraying a 0.5 wt % aqueous solution of sodium lauryl sulfate from Merck KGaA using a 2000 L Nauta® conical middle shear paddle mixer using at 150 rpm equipped with liquid intensifier spray system operated at 2 bars/150 rpm from Hosokawa Micron BV for 10 minutes mixing time.

The surface-active coating may improve surface contact between the polymeric particles and fusing agent applied during 3D printing, allowing the 3D printed parts to be printed more effectively.

Filler

In some examples, the build material can include one or more fillers. The fillers can be selected from natural or synthetic inorganic fillers such as glass beads, fumed silica, hollow glass beads, glass fibers, crushed glass, silicone dioxide, aluminum oxide, calcium carbonate, kaolin (hydrous aluminum silicate), and combinations thereof. The fillers can be selected from ceramic fillers such ceramic fibers, silicon carbide fibers, alumina fiber, and combinations thereof. The fillers can be selected from natural or synthetic organic fillers such as synthetic fibers such as carbon fibers, polypropylene fibers, polyamide fibers, polyoxymethylene fibers, ultra-high molecular weight polyethylene fibers, polytetrafluoroethylene fibers, liquid crystal (LCP) fibers, Kevlar® fibers, and combinations thereof.

In some examples, the filler can include inorganic oxides, carbides, borides and nitrides having a Knoop hardness of at least 1200. In some examples, the filler are inorganic oxides, nitrides, borides and carbides of zirconium, tantalum, titanium, tungsten, boron, aluminum and beryllium. In some examples, the filler is silicon carbide and aluminum oxide.

The filler can be a filler is a reinforcing material selected from the group consisting of glass beads, fumed silica, hollow glass beads, glass fibers, crushed glass, silicone dioxide, aluminum oxide, calcium carbonate, hydrous aluminum silicate, ceramic fibers, silicon carbide fibers, alumina fibers, carbon fibers, polypropylene fibers, polyamide fibers, polyoxymethylene fibers, ultra-high molecular weight polyethylene fibers, polytetrafluoroethylene fibers, liquid crystal fibers, Kevlar® fibers, and combinations thereof.

The filler can be a flame retarding compound selected from the group consisting of an alkali or earth alkali sulfonate, sulphonamide salt, perfluoroborate, halogenated compound and phosphorus-bearing organic compound, and combinations thereof.

The fillers can be added to the build material in an amount of up to about 30 wt % based on the total amount of the build material, or less than about 25 wt %, or less than about 20 wt %, or less than about 15 wt %, or less than about 10 wt %, or less than about 5 wt %.

In some examples, the build material composition can include glass as a filler. In an example, the glass is selected from the group consisting of solid glass beads, hollow glass beads, porous glass beads, glass fibers, crushed glass, and a combination thereof. In another example, the glass is selected from the group consisting of soda lime glass (Na$_2$O/CaO/SiO$_2$), borosilicate glass, phosphate glass, fused quartz, and a combination thereof. In still another example, the glass is selected from the group consisting of soda lime glass, borosilicate glass, and a combination thereof. In yet other examples, the glass may be any type of non-crystalline silicate glass.

In some examples, a surface of the glass is modified with a functional group selected from the group consisting of an acrylate functional silane, a methacrylate functional silane, an epoxy functional silane, an ester functional silane, an amino functional silane, and a combination thereof. Examples of glass modified with such functional groups and/or such functional groups that may be used to modify the glass are available from Potters Industries, LLC (e.g., an epoxy functional silane or an amino functional silane), Gelest Inc. (e.g., an acrylate functional silane or a methacrylate functional silane), Sigma-Aldrich (e.g., an ester functional silane), etc.

In a specific example, the glass is selected from the group consisting of soda lime glass, borosilicate glass, phosphate glass, fused quartz, and a combination thereof; or a surface of the glass is modified with a functional group selected from the group consisting of an acrylate functional silane, a methacrylate functional silane, an epoxy functional silane, an ester functional silane, an amino functional silane, and a combination thereof; or a combination thereof.

In some examples, the glass can be dry blended with the build material. In other examples, the glass can be encapsulated by the build material. When the glass is encapsulated by the build material, the build material may form a continuous coating (i.e., none of the glass is exposed) or a substantially continuous coating (i.e., 5% or less of the glass is exposed) on the glass. Whether the glass is dry blended with the build material or encapsulated by the build material may depend, in part, on i) the characteristics of the glass, and ii) the 3D printer with which the build material composition is to be used. As an example, when the glass includes glass fibers and/or crushed glass, the glass may be encapsulated by the build material. As another example, when segregation of dry blended build material and glass may occur and cause damage to the 3D printer in which the build material composition is to be used, the glass may be encapsulated by the build material.

The build material, the glass, and/or the encapsulated build material (i.e., the glass encapsulated by the build material) may be made up of similarly sized particles or differently sized particles. The term "particle size", as used herein, refers to the diameter of a spherical particle, or the average diameter of a non-spherical particle (i.e., the average of multiple diameters across the particle), or the volume-weighted mean diameter of a particle distribution. In an example, the average particle size of the build material composition ranges from about 5 μm to about 100 μm. In another example, the average particle size of the build material composition ranges from about 10 μm to about 100 μm.

In some examples, the average particle size(s) of the build material composition may depend on whether the glass is dry blended with the build material or encapsulated by the build material. When the glass is dry blended with the build material, the average particle size of the build material may range from about 20 μm to about 200 μm, and the average particle size of the glass may range from about 5 μm to about 150 μm. In an example, the D50 (i.e., the median of the particle size distribution, where % the population is above this value and % is below this value) of the build material may be about 60 μm.

When the glass is encapsulated by the build material, the average particle size of the glass (prior to being coated) may range from about 5 μm to about 100 μm. In another example, the average particle size of the glass (prior to being coated) may range from about 30 μm to about 50 μm. The average particle size of the encapsulated build material (i.e., the glass coated with the build material) may depend upon the size of the glass prior to coating and the thickness of the build material that is applied to the glass. In an example, the average particle size of the encapsulated build material may range from about 10 μm to about 200 μm. In another example, the average particle size of the encapsulated build material may range from about 20 μm to about 120 μm. In still another example, the D50 of the encapsulated build material may be about 60 μm.

The weight ratio of the glass to the build material ranges from about 5:95 to about 60:40. In some examples, the weight ratio of the glass to the build material ranges from about 10:90 to about 60:40; or from about 20:80 to about 60:40; or from about 40:60 to about 60:40; or from about 5:95 to about 40:60; or from about 5:95 to about 50:50. In another example, the weight ratio of the glass to the build material is 40:60. In still another example, the weight ratio of the glass to the build material is 50:50. In yet another example, the weight ratio of the glass to the build material is 60:40. In some instances, additives (e.g., antioxidant(s), brightener(s), charging agent(s), flow aid(s), etc.) may be included in the build material. In these instances, the weight of the build material, for the purpose of determining the weight ratio of the glass to the build material, may include the weight of the additives in addition to the weight of the polymer. In other instances, the weight of the build material, for the purpose of determining the weight ratio of the glass to the build material, includes the weight of the polymer alone (whether or not additives are included in the build material composition). The weight ratio of the glass to the build material may depend, in part, on the desired properties of the 3D part to formed, the glass used, the build material used, and/or the additives included in the build material.

In some examples, the build material composition, in addition to the build material and the glass, may include an antioxidant, a brightener, a charging agent, a flow aid, or a combination thereof. While several examples of these additives are provided, it is to be understood that these additives are selected to be thermally stable (i.e., will not decompose) at the 3D printing process temperatures.

Antioxidants

Antioxidant(s) may be added to the build material composition to prevent or slow molecular weight decreases of the build material and/or may prevent or slow discoloration (e.g., yellowing) of the build material by preventing or slowing oxidation of the build material. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the build material composition in an amount ranging from about 0.01 wt % to about 5 wt %, based on the total weight of the build material composition.

Flow Aids

Flow aid(s) may be added to improve the coating flowability of the build material composition. Flow aids may be particularly beneficial when the build material composition or the build material has an average particle size less than 100 µm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), calcium stearate (E470), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and aluminum oxide. In an example, the flow aid is added in an amount ranging from greater than 0 wt % to less than 5 wt %, based upon the total weight of the build material composition.

Antistatic Agents

In some examples, antistatic agent(s) can be added to the build material. The antistatic agent(s) may include a salt of an alkali or alkaline earth metal. The salt of the alkali or alkaline earth metal may include quaternary amines, chlorates, phosphates, carbonates, borates, phosphonates, sulfates, acetates, citrates, and perchlorates. Non-limiting examples of carbonates include sodium carbonates, potassium carbonates, lithium carbonates, barium carbonates, magnesium carbonates, calcium carbonates, ammonium carbonates, cobaltous carbonates, ferrous carbonates, lead carbonates, manganese carbonates, and nickel carbonates. Non-limiting examples of perchlorates include sodium perchlorate, potassium perchlorate, lithium perchlorate, barium perchlorate, magnesium perchlorate, calcium perchlorate, ammonium perchlorate, cobaltous perchlorate, ferrous perchlorate, lead perchlorate, manganese perchlorate, and nickel perchlorate. Non-limiting examples of chlorates include sodium chlorates, potassium chlorates, lithium chlorates, barium chlorates, magnesium chlorates, calcium chlorates, ammonium chlorates, cobaltous chlorates, ferrous chlorates, lead chlorates, manganese chlorates, and nickel chlorates. Non-limiting examples of phosphates include sodium phosphates, potassium phosphates, lithium phosphates, barium phosphates, magnesium phosphates, calcium phosphates, ammonium phosphates, cobaltous phosphates, ferrous phosphates, lead phosphates, manganese phosphates, and nickel phosphates. The antistatic agent may also be a sulfonimide or a sulfonamide, a neoalkoxy titanate and zirconate.

In some examples, the antistatic agent can be thermally stable at a polymer melt processing temperature.

In some examples, the antistatic agent can be selected from the group consisting of Li2NiBr4, Li2CuCl4, LiCuO, LiCu4O(PO4)2, LiSOCl2, LiSO2Cl2, LiSO2, LiI2, LiN3, C6H5COOLi, LiBr, Li2CO3, LiCl, C6H11(CH2)3CO2Li, LiBO2, LiClO4, Li3PO4, Li2SO4, Li2B4O7, LiAlCl4, AuCl4Li, LiGaCl4, LiBF4, LiMnO2, LiFeS2, LiAg2CrO4, LiAg2V4O11, LiSVO, LiCSVO, CF3SO3Li, LiPF6, LiBF4, LiClO4, LiCuS, LiPbCuS, LiFeS, LiBi2Pb2O5, LiBi2O3, LiV2O5, LiCoO2, LiNiCoO2, LiCuCl2, Li/Al—V2O5, lithium bis(oxalato)borate, LiN(SO2CF3)2, LiN(SOCF2CF3)2, LiAsF6, LiC(SO2CF3)3, LiN(SO2F)2, LiN(SO2F)(SO2CF3), LiN(SO2F)(SO2C4F9), LiOSO2CF3, and combinations thereof.

The antistatic agent may be present in the build material in an amount ranging from about 0.01 wt. % to about 20 wt. % based upon the total weight percent of the build material. In an example, the antistatic agent may be present in the build material in an amount ranging from about 0.1 wt. % to about 15 wt. %, for example, from about 2 wt. % to about 13 wt. %, for example, about 4 wt. % based upon the total weight percent of the composition.

Other Build Material Additives

Brightener(s) may be added to the build material composition to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), barium titanate and combinations thereof. In some examples, a stilbene derivative may be used as the brightener. In these examples, the temperature(s) of the 3D printing process may be selected so that the stilbene derivative remains stable (i.e., the 3D printing temperature does not thermally decompose the stilbene derivative). In an example, the brightener may be included in the build material composition in an amount ranging from greater than 0 wt % to about 10 wt %, based on the total weight of the build material composition.

Charging agent(s) may be added to the build material composition to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt %, based upon the total weight of the build material composition.

The amounts of the above additives in e.g. fusing agent, colour printing liquid or detailing agent can total up to about 20 wt % based on the total weight of one of the agent(s)/composition(s).

Printing Methods

Figure 2:
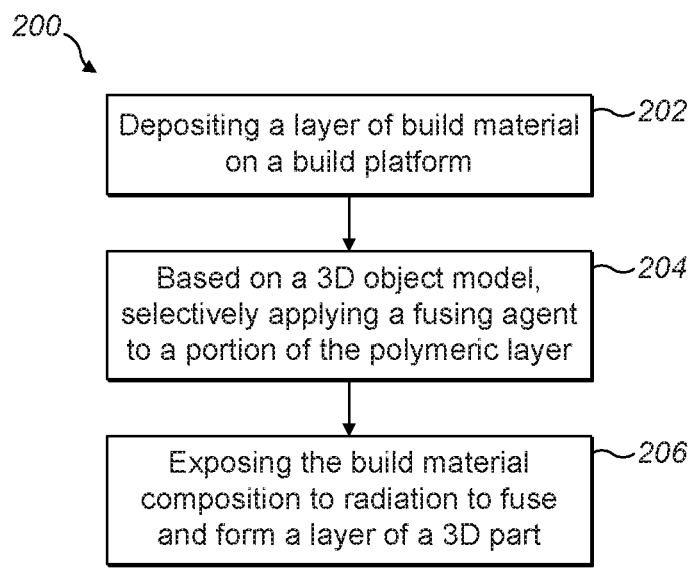
FIG. 2 is a flow diagram illustrating an example of a method for three-dimensional printing.

Referring now to FIG. 2, disclosed is a method for three-dimensional printing 200 comprising: depositing a layer of a build material on a build platform 202; based on a 3D object model, selectively applying a fusing agent to at least a portion of the layer of the polymeric powder build material 204, wherein the fusing agent comprises at least one infrared absorbing compound; and exposing the build material composition to radiation to fuse, bind or coalesce the at least the portion to form a layer of a 3D part 206.

Referring now to FIG. 2 and FIGS. 3A through 3E an example of a method 200 for three-dimensional printing is depicted. Prior to execution of the method 200 or as part of the method 200, a controller 30 (see, e.g., FIG. 4) may access data stored in a data store 32 (see, e.g., FIG. 4) pertaining to a 3D part that is to be printed. The controller 30 may determine the number of layers of the build material 16 that are to be formed and the locations at which the fusing agent 26 from the applicator 24 is to be deposited on each of the respective layers.

Briefly, the method 200 for three-dimensional (3D) printing comprises: depositing a build material 16 to form a build material layer 38 (reference numeral 202); based on a 3D object model, selectively applying a fusing agent 26 on at least a portion 40 of the build material 16 (reference numeral 204); and exposing the build material 16 to radiation 44 to fuse the at least the portion 40 to form a layer 46 of a 3D part (reference numeral 206).

While not shown, the method 200 may include forming the build material 16. In an example, the build material 16 is formed prior to applying the build material 16.

Figure 3A:
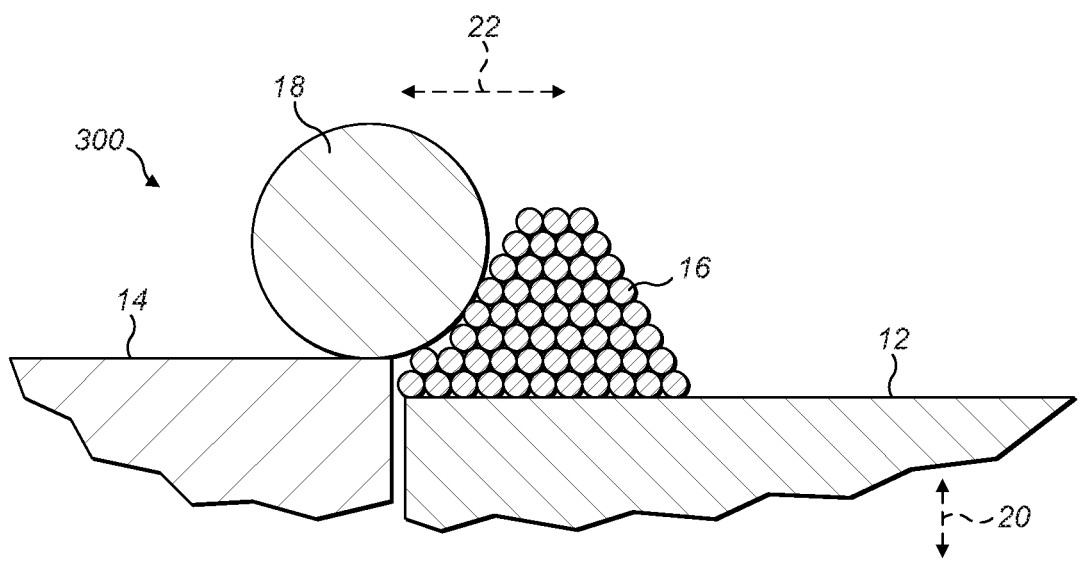
FIGS. 3A through 3E are schematic and partially cross-sectional cutaway views depicting the formation of a 3D part using an example of the 3D printing method disclosed herein.
Figure 3B:
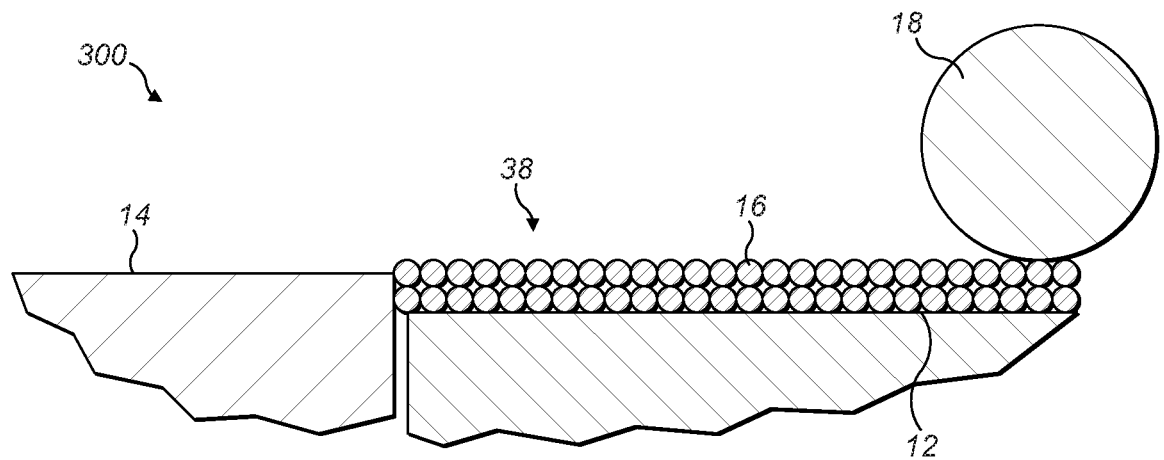

As shown at reference numeral 202 in FIG. 2 and in FIGS. 3A and 3B, the method 200 includes depositing the build material 16 to form the build material layer 38.

In the example shown in FIGS. 3A and 3B, a printing system (e.g., the printing system 10 shown in FIG. 4) may be used to apply the build material 16. The printing system 10 may include a build area platform 12, a build material supply 14 containing the build material 16, and a build material distributor 18.

The build area platform 12 receives the build material 16 from the build material supply 14. The build area platform 12 may be moved in the directions as denoted by the arrow 20, e.g., along the z-axis, so that the build material 16 may be delivered to the build area platform 12 or to a previously formed layer 46. In an example, when the build material 16 is to be delivered, the build area platform 12 may be programmed to advance (e.g., downward) enough so that the build material distributor 18 can push the build material 16 onto the build area platform 12 to form a substantially uniform layer 38 of the build material 16 thereon. The build area platform 12 may also be returned to its original position, for example, when a new part is to be built.

The build material supply 14 may be a container, bed, or other surface that is to position the build material 16 between the build material distributor 18 and the build area platform 12.

The build material distributor 18 may be moved in the directions as denoted by the arrow 22, e.g., along the y-axis, over the build material supply 14 and across the build area platform 12 to spread the layer 38 of the build material 16 over the build area platform 12. The build material distributor 18 may also be returned to a position adjacent to the build material supply 14 following the spreading of the build material 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller. In some examples, the build material supply 14 or a portion of the build material supply 14 may translate along with the build material distributor 18 such that build material 16 is delivered continuously to the material distributor 18 rather than being supplied from a single location at the side of the printing system 10 as depicted in FIG. 3A.

As shown in FIG. 3A, the build material supply 14 may supply the build material 16 into a position so that it is ready to be spread onto the build area platform 12. The build material distributor 18 may spread the supplied build material 16 onto the build area platform 12. The controller 30 may process control build material supply data, and in response, control the build material supply 14 to appropriately position the build material particles 16, and may process control spreader data, and in response, control the build material distributor 18 to spread the supplied build material 16 over the build area platform 12 to form the layer 38 of build material 16 thereon. As shown in FIG. 3B, one build material layer 38 has been formed.

The layer 38 of the build material 16 has a substantially uniform thickness across the build area platform 12. In an example, the thickness of the build material layer 38 is about 100 µm. In another example, the thickness of the build material layer 38 ranges from about 30 µm to about 300 µm, although thinner or thicker layers may also be used. For example, the thickness of the build material layer 38 may range from about 20 µm to about 500 µm, or from about 50 µm to about 80 µm. The layer thickness may be about 2× (i.e., 2 times) the particle diameter (as shown in FIG. 3B) at a minimum for finer part definition. In some examples, the layer thickness may be about 1.2× the particle diameter.

After the build material 16 has been applied, and prior to further processing, the build material layer 38 may be exposed to heating. Heating may be performed to pre-heat the build material 16, and thus the heating temperature may be below the melting point or softening point of the polymer of the build material 16. As such, the temperature selected will depend upon the build material 16 that is used. As examples, the pre-heating temperature may be from about 5° C. to about 50° C. below the melting point or softening point of the polymer of the build material 16. In an example, the pre-heating temperature ranges from about 50° C. to about 250° C. In another example, the pre-heating temperature ranges from about 150° C. to about 170° C.

Pre-heating the layer 38 of the build material 16 may be accomplished by using any suitable heat source that exposes all of the build material 16 on the build area platform 12 to the heat. Examples of the heat source include a thermal heat source (e.g., a heater (not shown) integrated into the build are platform 12 (which may include sidewalls)) or the radiation source 34, 34' (see, e.g., FIG. 4).

Figure 3C:
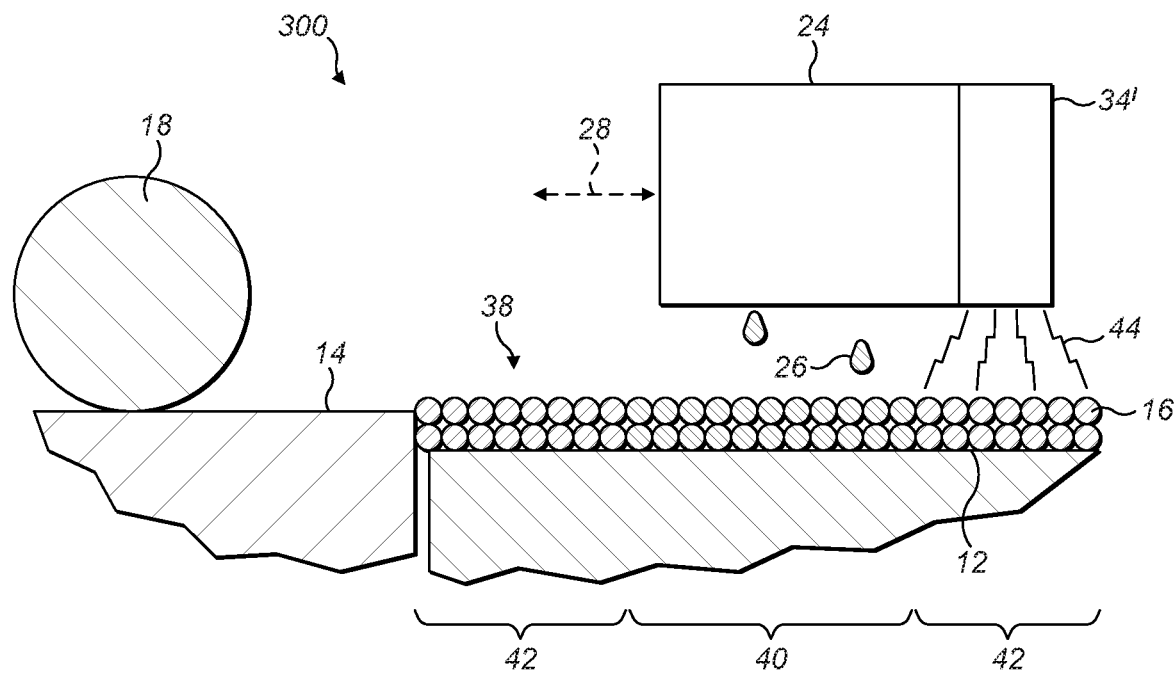

As shown at reference numeral 204 in FIG. 2 and in FIG. 3C, the method 200 continues by, based on a 3D object model, selectively applying the fusing agent 26 on at least a portion 40 of the build material 16. Example compositions of the fusing agent 26 are described below.

It is to be understood that a single fusing agent 26 may be selectively applied on the portion 40, or multiple fusing agents 26 may be selectively applied on the portion 40. As an example, multiple fusing agents 26 may be used to create a multi-colored part. As another example, one fusing agent 26 may be applied to an interior portion of a layer and/or to interior layer(s) of a 3D part, and a fusing agent 26 may be applied to the exterior portion(s) of the layer and/or to the exterior layer(s) of the 3D part. In the latter example, the color of the fusing agent 26 will be exhibited at the exterior of the part.

As illustrated in FIG. 3C, the fusing agent 26 may be dispensed from the applicator 24. The applicator 24 may be a thermal inkjet printhead, a piezoelectric printhead, a continuous inkjet printhead, etc., and the selectively applying of the fusing agent 26 may be accomplished by thermal inkjet printing, piezo electric inkjet printing, continuous inkjet printing, etc.

The controller 30 may process data, and in response, control the applicator 24 (e.g., in the directions indicated by the arrow 28) to deposit the fusing agent 26 onto predetermined portion(s) 40 of the build material layer 38 that are to become part of the 3D part. The applicator 24 may be programmed to receive commands from the controller 30 and to deposit the fusing agent 26 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 3C, the applicator 24 selectively applies the fusing agent 26 on those portion(s) 40 of the build material layer 38 that is/are to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the build material layer 38. In the example shown in FIG. 3C, the fusing agent 26 is deposited on the portion 40 of the build material layer 38 and not on the portions 42.

The volume of the fusing agent 26 that is applied per unit of the build material 16 in the patterned portion 40 may be sufficient to absorb and convert enough radiation 44 so that the build material 16 in the patterned portion 40 will fuse/coalesce. The volume of the fusing agent 26 that is applied per unit of the build material 16 may depend, at least in part, on the radiation absorber used, the radiation absorber loading in the fusing agent 26, and the build material 16 used.

Figure 3D:
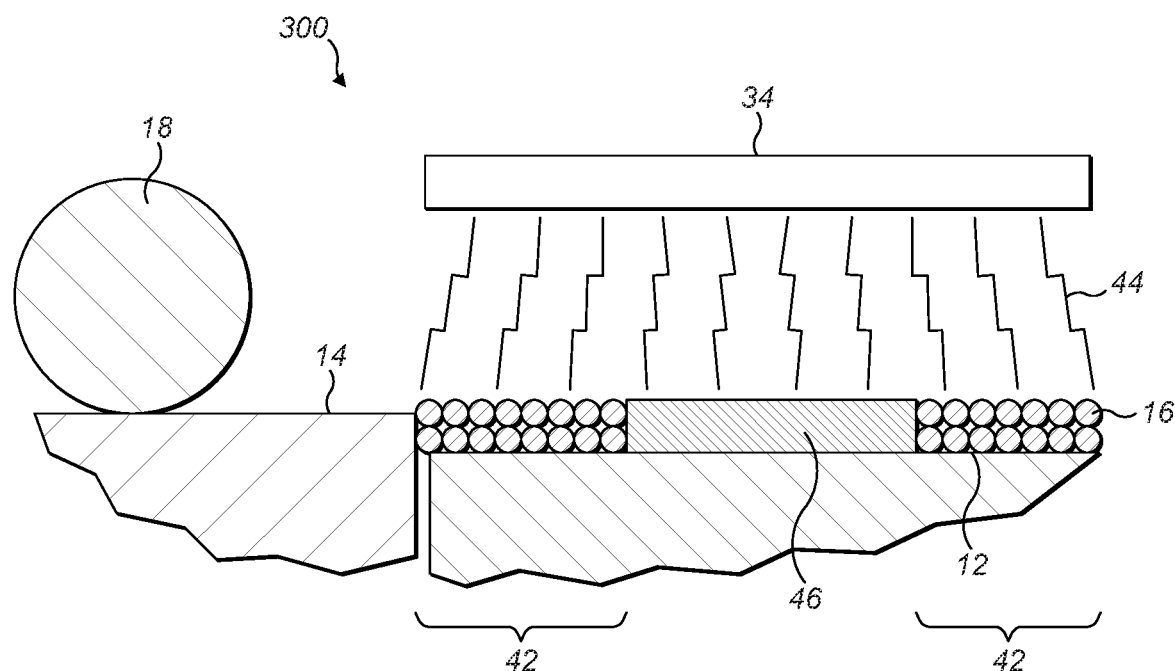

As shown at reference numeral 206 in FIG. 2 and FIGS. 3C and 3D, the method 200 continues by exposing the build material 16 to radiation 44 to fuse/coalesce the at least the portion 40 to form a layer 46 of a 3D part. The radiation 44 may be applied with the source 34 of radiation 44 as shown in FIG. 3D or with the source 34' of radiation 44 as shown in FIG. 3C.

The fusing agent 26 enhances the absorption of the radiation 44, converts the absorbed radiation 44 to thermal energy, and promotes the transfer of the thermal heat to the build material 16 in contact therewith. In an example, the fusing agent 26 sufficiently elevates the temperature of the build material 16 in the layer 38 above the melting or softening point of the polymer of the build material 16, allowing fusing/coalescing (e.g., thermal merging, melting, binding, etc.) of the build material 16 to take place. The application of the radiation 44 forms the fused layer 46, shown in FIG. 3D.

It is to be understood that portions 42 of the build material layer 38 that do not have the fusing agent 26 applied thereto do not absorb enough radiation 44 to fuse/coalesce. As such, these portions 42 do not become part of the 3D part that is ultimately formed. The build material 16 in portions 42 may be reclaimed to be reused as build material in the printing of another 3D part.

In some examples, the method 200 further comprises repeating the applying of the build material 16, the selectively applying of the fusing agent 26, and the exposing of the build material 16, wherein the repeating forms the 3D part including the layer 46. In these examples, the processes shown in FIG. 2 and FIGS. 3A through 3D may be repeated to iteratively build up several fused layers and to form the 3D printed part.

Figure 3E:
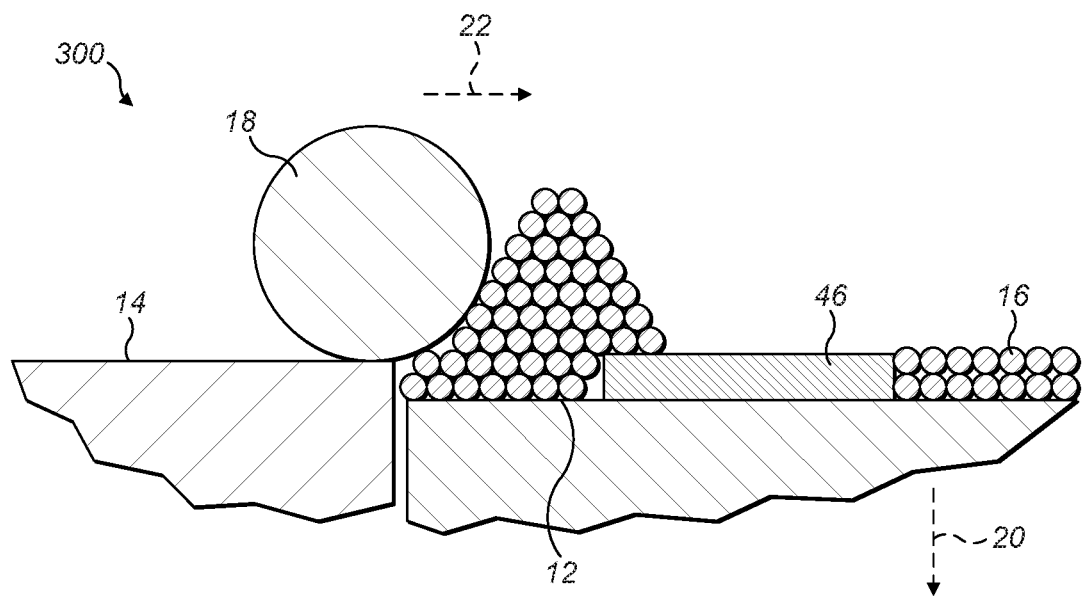

FIG. 3E illustrates the initial formation of a second build material layer on the previously formed layer 46. In FIG. 3E, following the fusing/coalescing of the predetermined portion(s) 40 of the build material 16, the controller 30 may process data, and in response cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material 16 (e.g., through operation of an elevator, an auger, or the like) and the build material distributor 18 to form another build material layer on top of the previously formed layer 46 with the additional build material 16. The newly formed build material layer may be in some instances pre-heated, patterned with the fusing agent 26, and then exposed to radiation 44 from the source 34, 34' of radiation 44 to form the additional fused layer.

Several variations of the previously described method 200 will now be described.

In some examples of the method 200, a detailing agent may be used. The composition of the detailing agent is described below. The detailing agent may be dispensed from another (e.g., a second) applicator (which may be similar to applicator 24) and applied to portion(s) of the build material 16.

The detailing agent may provide an evaporative cooling effect to the build material 16 to which it is applied. The cooling effect of the detailing agent reduces the temperature of the build material 16 containing the detailing agent during energy/radiation exposure. The detailing agent, and its rapid cooling effect, may be used to obtain different levels of melting/fusing/binding within the layer 46 of the 3D part that is being formed. Different levels of melting/fusing/binding may be desirable to control internal stress distribution, warpage, mechanical strength performance, and/or elongation performance of the final 3D part.

In an example of using the detailing agent to obtain different levels of melting/fusing/binding within the layer 46, the fusing agent 26 may be selectively applied according to the pattern of the cross-section for the layer 46 of the 3D part, and the detailing agent may be selectively applied on at least some of that cross-section. As such, some examples of the method 200 further comprise selectively applying, based on the 3D object model, the detailing agent on the at least some of the at least the portion 40 of the build material 16. The evaporative cooling provided by the detailing agent may remove energy from the at least some of the portion 40; however, since the fusing agent 26 is present with the detailing agent, fusing is not completely prevented. The level of fusing may be altered due to the evaporative cooling, which may alter the internal stress distribution, warpage, mechanical strength performance, and/or elongation performance of the 3D part. It is to be understood that when the detailing agent is applied within the same portion 40 as the fusing agent 26, the detailing agent may be applied in any desirable pattern. The detailing agent may be applied before, after, or at least substantially simultaneously (e.g., one immediately after the other in a single printing pass, or at the same time) with the fusing agent 26, and then the build material 16 is exposed to radiation.

In some examples, the detailing agent may also or alternatively be applied after the layer 46 is fused to control thermal gradients within the layer 46 and/or the final 3D part. In these examples, the thermal gradients may be controlled with the evaporative cooling provided by the detailing agent.

In another example that utilizes the evaporative cooling effect of the detailing agent, the method 200 further comprises selectively applying the detailing agent on another portion 42 of the build material composition 16 to aid in preventing the build material 16 in the other portion 42 from fusing. In these examples, the detailing agent is selectively applied, based on the 3D object model, on the other portion(s) 42 of the build material 16. The evaporative cooling provided by the detailing agent may remove energy from the other portion 42, which may lower the temperature of the build material 16 in the other portion 42 and prevent the build material 16 in the other portion 42 from fusing/coalescing.

In some examples of the method 200 a coloring agent may be used. The coloring agent may be selected from the group consisting of a black ink, a cyan ink, a magenta ink, and a yellow ink. The composition of the coloring agent is described below. The coloring agent may be dispensed from another (e.g., a third applicator which may be similar to applicator 24) and applied to portion(s) of the build material 16.

The coloring agent may color the build material 16 to which it is applied. The color of the coloring agent may then be exhibited by the 3D part. The coloring agent may be used to obtain colored or multicolored 3D printed parts.

In an example, the fusing agent 26 may be selectively applied according to the pattern of the cross-section for the layer 46 of the 3D part, and the coloring agent may be selectively applied on at least some of that cross-section. As such, some examples of the method 200 further comprise selectively applying, based on the 3D object model, the coloring agent on the at least some of the at least the portion 40 of the build material 16, the coloring agent being selected from the group consisting of a black ink, a cyan ink, a magenta ink, and a yellow ink. The coloring agent may cause the 3D part to exhibit the color (e.g., black, cyan, magenta, yellow, etc.) of the coloring agent. Multiple coloring agents may be used to impart multiple colors to the 3D part. It is to be understood that when the coloring agent(s) is/are applied within the same portion 40 as the fusing agent 26, the coloring agent(s) may be applied in any desirable pattern. The coloring agent may be applied before, after, or at least substantially simultaneously (e.g., one immediately after the other in a single printing pass, or at the same time) with the fusing agent 26, and then the build material 16 is exposed to radiation. In other examples, the coloring agent(s) may be applied to the finished 3D part. In these examples, the coloring agent(s) may be used to add color(s) to the exterior of the part.

In some examples, the method 200 further comprises: upon completion of the 3D part, placing the 3D part in an environment having a temperature ranging from about 15° C. to 30° C.; and maintaining the 3D part in the environment until a temperature of the 3D part reaches the temperature of the environment. In these examples, the 3D part is allowed to cool in a room temperature environment (e.g., a temperature ranging from about 15° C. to 30° C.) upon completion of the 3D part (e.g., within about 5 minutes of forming the 3D part). As such, these examples of the method 200 may be faster than examples that include heating the 3D part after its formation (i.e., exposing the 3D part to an aging process).

In other examples, the method 200 further comprises heating the 3D part at a temperature ranging from greater than 30° C. to about 177° C. for a time period ranging from greater than 0 hours to about 144 hours. In an example, the 3D part is heated at a temperature ranging from about 130° C. to about 177° C. In another example, the 3D part is heated at a temperature ranging from about 150° C. to about 177° C. In still another example, the 3D part is heated a temperature ranging from about 165° C. to about 177° C. In yet another example, the 3D part is heated a temperature of about 165° C. In another example, the 3D part is heated for a time period ranging from greater than 0 hours to about 48 hours. In still another example, the 3D part is heated for about 22 hours. The time period for which the 3D part is heated may depend, in part, on the temperature at which the 3D part is heated. For example, when the temperature at which the 3D part is heated is higher (e.g., 165° C.) the time period for which the 3D part is heated may be shorter (e.g., 22 hours). As another example, when the temperature at which the 3D part is heated is lower (e.g., 35° C.) the time period for which the 3D part is heated may be longer (e.g., 140 hours).

Heating may be accomplished by any suitable means. For example, the 3D part may be heated in an oven. Heating the 3D part after its formation may further increase the ultimate tensile strength of the 3D part (as compared to ultimate tensile strength of a 3D part that was allowed to cool in a room temperature environment upon completion of the 3D part).

In an example of the method 200, the 3D part has an ultimate tensile strength greater than or equal to 15 MPa. In another example, the 3D part formed by the method 200 has an ultimate tensile strength greater than or equal to 20 MPa. In any of these examples, the ultimate tensile strength may be achieved whether the method 200 includes allowing the 3D part to cool after formation or the method 200 includes heating the 3D part after formation.

Printing Systems

Figure 4:
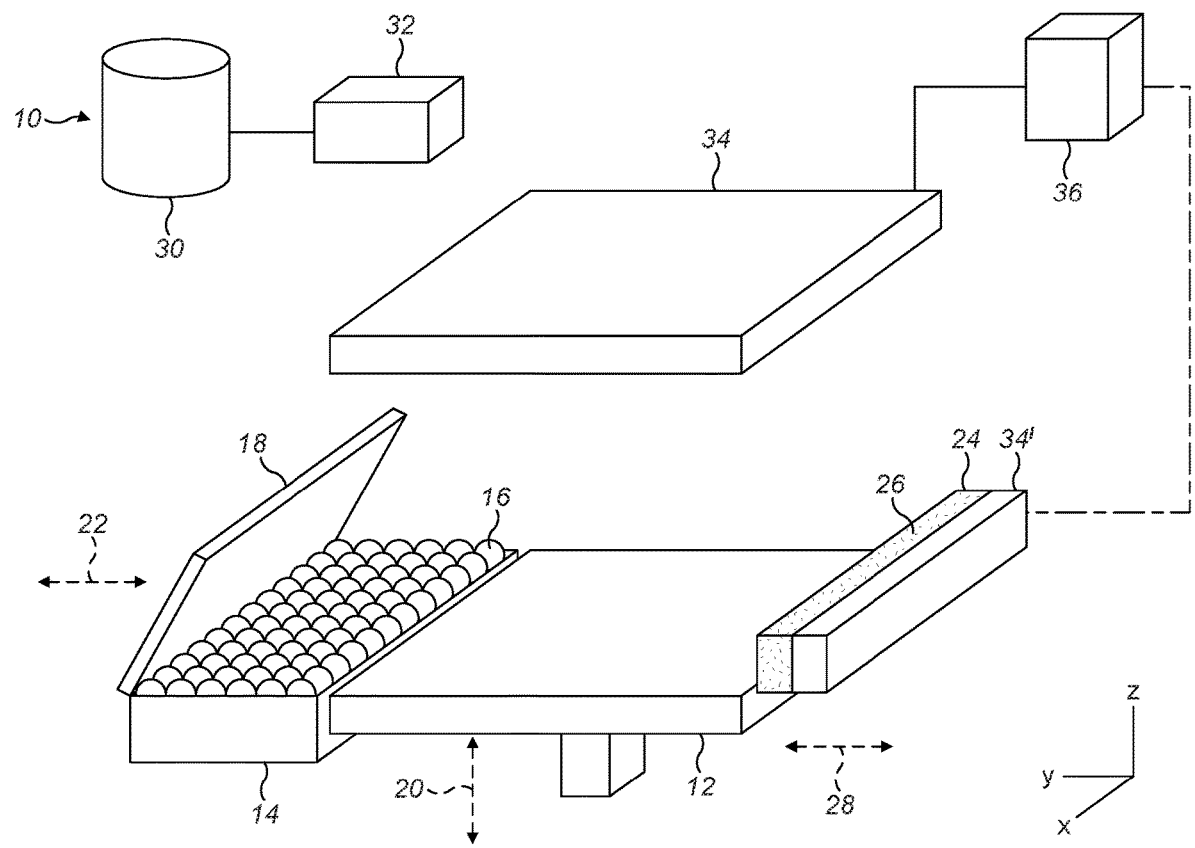
FIG. 4 is a simplified isometric and schematic view of an example of a 3D printing system disclosed herein.

Referring now to FIG. 4, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 4 may not be drawn to scale and thus, the 3D printing system 10 may have a different size and/or configuration other than as shown therein.

In an example, the three-dimensional (3D) printing system 10, comprises: a supply 14 of a build material composition; a build material distributor 18; a supply of a fusing agent 26; an applicator 24 for selectively dispensing the fusing agent 26; a source 34, 34' of radiation 44; a controller 30; and a non-transitory computer readable medium having stored thereon computer executable instructions to cause the controller 30 to: utilize the build material distributor 18 to dispense the build material 16; utilize the applicator 24 to selectively dispense the fusing agent 26 on at least a portion 40 of the build material 16; and utilize the source 34, 34' of radiation 44 to expose the build material 16 to radiation 44 to fuse/coalesce the portion 40 of the build material 16.

In some examples, the 3D printing system 10 may further include a supply of a detailing agent; a second applicator for selectively dispensing the detailing agent; a supply of a coloring agent; and/or a third applicator for selectively dispensing the coloring agent (none of which are shown). In these examples, the computer executable instructions may further cause the controller 30 to utilize the second applicator to selectively dispense the detailing agent; and/or utilize the third applicator to selectively dispense the coloring agent on at least some of the at least the portion 40.

As shown in FIG. 4, the printing system 10 includes the build area platform 12, the build material supply 14 containing the build material 16 including the build material and the glass, and the build material distributor 18.

As mentioned above, the build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material 16 over the build area platform 12 (e.g., a counter-rotating roller).

As shown in FIG. 4, the printing system 10 also includes the applicator 24, which may contain the fusing agent 26. The applicator 24 may be scanned across the build area platform 12 in the directions indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 4 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of the build material 16. The applicator 24 may thus be attached to a moving XY stage or a translational carriage (neither of which is shown) that moves the applicator 24 adjacent to the build area platform 12 in order to deposit the fusing agent 26 in predetermined areas 40 of the build material layer 38 that has been formed on the build area platform 12 in accordance with the method 200 disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, the volume of each drop may be on the order of about 3 picoliters (pl) to about 18 pl, although it is contemplated that a higher or lower drop volume may be used. In some examples, the applicator 24 is able to deliver variable drop volumes of the fusing agent 26. One example of a suitable printhead has 600 DPI resolution and can deliver drop volumes ranging from about 6 pl to about 14 pl.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material 16, the fusing agent 26, etc. may be derived from a model of the 3D part to be formed. For instance, the data may include the locations on each build material layer 38 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of build material 16 that is supplied by the build material supply 14, the movement of the build area platform 12, the movement of the build material distributor 18, the movement of the applicator 24, etc.

As shown in FIG. 4, the printing system 10 may also include a source 34, 34' of radiation 44. In some examples, the source 34 of radiation 44 may be in a fixed position with respect to the build material platform 12. The source 34 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 34' of radiation 44 may be positioned to apply radiation 44 to the build material 16 immediately after the fusing agent 26 has been applied thereto. In the example shown in FIG. 4, the source 34' of radiation 44 is attached to the side of the applicator 24 which allows for patterning and heating/exposing to radiation 44 in a single pass.

The source 34, 34' of radiation 44 may emit radiation 44 having wavelengths ranging from about 100 nm to about 1 mm. As one example, the radiation 44 may range from about 800 nm to about 2 µm. As another example, the radiation 44 may be blackbody radiation with a maximum intensity at a wavelength of about 1100 nm. The source 34, 34' of radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of radiation 44 may be operatively connected to a lamp/laser driver, an input/output temperature controller, and temperature sensors, which are collectively shown as radiation system components 36. The radiation system components 36 may operate together to control the source 34, 34' of radiation 44. The temperature recipe (e.g., radiation exposure rate) may be submitted to the input/output temperature controller. During heating, the temperature sensors may sense the temperature of the build material 16, and the temperature measurements may be transmitted to the input/output temperature controller. For example, a thermometer associated with the heated area can provide temperature feedback. The input/output temperature controller may adjust the source 34, 34' of radiation 44 power set points based on any difference between the recipe and the real-time measurements. These power set points are sent to the lamp/laser drivers, which transmit appropriate lamp/laser voltages to the source 34, 34' of radiation 44. This is one example of the radiation system components 36, and it is to be understood that other radiation source control systems may be used. For example, the controller 30 may be configured to control the source 34, 34' of radiation 44.

Printed Parts

The method(s) of the present disclosure may be used to 3D print a printed part. The printed part may be an automotive part. In some examples, the build material of the present disclosure may be used to three-dimensionally print a printed part with e.g. high stiffness.

In some examples, the printed part may have a tensile strength at yield (ISO527) of at least about 15 MPa, for example, at least about 18 MPa. In some examples, the printed part may have a tensile strength at yield (ISO527) of at most about 60 MPa, for example, at most about 52 MPa. In some examples, the printed part may have a tensile strength at yield (ISO527) of about 15 to about 60 MPa or about 18 MPa to about 52 MPa. In some examples, the printed part may have a tensile strength at yield (ISO527) of about 20 to about 35 MPa, for example, about 25 to about 30 MPa.

In some examples, the printed part may have a tensile modulus (ISO527) of at least about 0.5 GPa, for example, at least about 0.8 GPa. In some examples, the printed part may have a tensile modulus (ISO527) of at most about 6 GPa, for example, at most about 5 GPa. In some examples, the printed part may have a modulus (ISO527) of about 0.5 to about 5 GPa or about 0.8 to about 3.5 GPa. In some examples, the printed part may have a tensile modulus (ISO527) of about 1.5 to about 3.5 GPa, for example, about 2 to about 3 GPa.

In some examples, the printed part may have an impact strength (Notched Charpy at 23 degrees C., ISO179) of at least about 1.7, for example, at least about 5 kJ/m$^2$. In some examples, the printed part may have an impact strength (Notched Charpy at 23 degrees C., ISO179) of at most about 12, for example, at most about 11 kJ/m$^2$. In some examples, the printed part may have an impact strength (Notched Charpy at 23 degrees C., ISO179) of about 5 to about 11, for example, about 7 to about 10, or about 8 to about 9 kJ/m$^2$.

In some examples, the printed part may have an impact strength (Notched Izod at 23 degrees C., ISO180) of at least about 10, for example, at least about 11 kJ/m$^2$. In some examples, the printed part may have an impact strength (Notched Izod at 23 degrees C., ISO180) of at most about 17, for example, at most about 15 kJ/m$^2$. In some examples, the printed part may have an impact strength (Notched Izod at 23 degrees C., ISO180) of about 11 to about 15, for example, about 12 to about 14, or about 13 kJ/m$^2$.

In some examples, the printed part may have an impact strength (Notched Charpy at −40 degrees C., ISO179) of at least about 1, for example, at least about 2 kJ/m$^2$. In some examples, the printed part may have an impact strength (Notched Charpy at −40 degrees C., ISO179) of at most about 10, for example, at most about 8 kJ/m$^2$. In some examples, the printed part may have an impact strength (Notched Charpy at −40 degrees C., ISO179) of about 3 to about 6, for example, about 4 to about 5 kJ/m$^2$.

In some examples, the printed part may have a heat aged delta from original of tensile strength at yield (ISO188) of +/−25%.

In some examples, the printed part may have a heat aged delta from original of impact strength notched Charpy at 23 degrees C. (ISO179) of +/−25%.

In some examples, the printed part may have a heat aged delta from original of impact strength notched Charpy at 23 degrees C. (ISO179) of +/−25%.

In some examples, the printed part may have an elongation at break (ISO527) of at least about 3%. In some examples, the printed part may have an elongation at break (ISO527) of at most about 12%. In some examples, the printed part may have an elongation at break (ISO527) of about 3.5 to about 10%, for example, about 4 to about 9% or about 4 to about 6% (e.g. 5%).

In some examples, the printed part may have a flexural modulus (ISO178) of at least about 0.7 GPa, or at least about 1 GPa. In some examples, the printed part may have a flexural modulus (ISO178) of at most about 4 GPa. In some examples, the printed part may have a flexural modulus (ISO178) of about 0.7 to about 4 GPa, about 1.5 to about 3.6 GPa or about 2 to about 3 GPa, for instance, 2.5 GPa.

In some examples, the printed part may have at least two of: i) a tensile strength at yield (ISO527) of about 18 to about 35 MPa, for example, about 20 to about 30 MPa; ii) a tensile modulus (ISO527) of about 1.2 to about 3.5 GPa, for example, about 1.6 to about 2.6 GPa; iii) an impact strength (Notched Charpy at 23 degrees C., ISO179) of about 2 to about 11, for example, about 7 to about 10, or about 8 to about 9 kJ/m$^2$; iv) an impact strength (Notched Izod at 23 degrees C., ISO180) of about 11 to about 15, for example, about 12 to about 14, or about 13 kJ/m$^2$; v) an impact strength (Notched Charpy at −40 degrees C., ISO179) of about 2 to about 6, for example, about 4 to about 5 kJ/m$^2$; and vi) a flexural modulus (ISO178) of about 0.7 to about 4 GPa, about 1.5 to about 3.6 GPa or about 2 to about 3 GPa, for instance, 2.5 GPa and an elongation at break of about 3% to about 150%, for example about 10% to about 50%.

Examples of suitable printed parts include automotive parts, including water coolant, windshield fluids tanks and piping, caps, jigs, fixture, brackets and clips, air ducts and piping, sensors housings, lamp casings, heater casings, cooling fans and shrouds, electrical housings, battery housings, automotive instrument panels, glove box, console modules, automotive body parts, dashboards, interior and exterior trims, fuel systems, bumpers, gears, door components, gear housings, handles and wheel covers, windscreen wipers components, leaf springs, heating, ventilation and air-conditioning (HVAC) parts, arm rests, body panels, consoles, floor panels, grilles, instrument panel supports, knee bolsters, pillar trims, rear parcel shelves, steering wheel shrouds, sun visors and associated spare parts for each of the above listed automotive component, Fusing Agents In the examples of the method 200 and the system 10 mentioned above, a fusing agent 26 may be used. Examples of the fusing agent 26 are dispersions including a radiation absorber (i.e., an active material). The active material may be any infrared light absorbing colorant.

In some examples, the fusing agent comprises an infrared absorbing, for example, a near infrared absorbing compound.

In some examples, the near infrared absorbing compound is selected from the group consisting of carbon black, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, and combinations thereof.

The cyanine dyes can be selected from the group consisting of carbocyanine, azacarbocyanine, hemicyanine, styryl, diazacarbocyanine, triazacarbocyanine, diazahemicyanine, polymethinecyanine, azapolymethinecyanine, holopolar, indocyanine, diazahemicyanine dyes, and combinations thereof.

In some examples, the near infrared absorbing compound is carbon black.

In some examples, the fusing agent further comprises: at least one co-solvent; at least one surfactant; at least one anti-kogation agent; at least one chelating agent; at least one buffer solution; at least one biocide; and water.

In some examples, the fusing agent is added in the three-dimensional printing composition in an amount of from about 1 wt % to about 30 wt % based on the total weight of the three-dimensional printing composition, or from about 5 wt % to about 25 wt %, or from about 8 wt % to about 20 wt %, or less than about 35 wt %, or less than about 25 wt %, or less than about 20 wt %, or less than about 15 wt %, or less than about 10 wt %, or at least about 1 wt %, or at least about 3 wt %, or at least about 5 wt %, or at least about 8 wt %, or at least about 10 wt %, or at least about 15 wt %, or at least about 20 wt %, or at least about 30 wt %, or at least about 35 wt %.

In some examples, the near infrared absorbing compound in the fusing agent is present in an amount of at least about 1 wt % based on the total weight of fusing agent, or at least about 3 wt %, or at least about 5 wt %, or at least about 7 wt %, or at least about 10 wt %, or at least 15 wt %, or less than about 20 wt %, or less than about 15 wt %, or less than about 12 wt %, or less than about 10 wt %, or less than about 8 wt %, or less than about 7 wt %, or less than about 6 wt %, or less than about 5 wt %.

The fusing agent 218 is a jettable composition. The fusing agent composition is an aqueous jettable composition that includes radiation absorbing agent (i.e., an active material) and an aqueous vehicle. Examples of the fusing agent 218 are water-based dispersions including a radiation absorbing agent (i.e., an active material). The amount of the active material in the fusing agent may depend upon how absorbing the active material is. In an example, the fusing agent may include the active material and may be applied in an amount sufficient to include at least 0.01 wt % of the active material in the 3D part layer that is formed with the fusing agent. Even this low amount can produce a black colored part layer. The fusing agents tend to have significant absorption (e.g., 80%) in the visible region (400 nm-780 nm). This absorption generates heat suitable for fusing during 3D printing, which leads to 3D parts having mechanical integrity and relatively uniform mechanical properties (e.g., strength, elongation at break, etc.). The radiation absorbing agent is a dispersion of material in the aqueous vehicle. As used herein, the term "dispersion" refers to a two-phases system where one phase consists of finely divided radiation absorbing agent distributed throughout a bulk substance, i.e. liquid vehicle. The radiation absorbing agent is the dispersed or internal phase and the bulk substance is the continuous or external phase (liquid vehicle). As disclosed herein the liquid medium is an aqueous liquid medium, i.e. comprising water.

The active material, or radiation absorbing agent, may be any infrared light absorbing colorant that is black. In an example, the active material, or radiation absorbing agent is a near infrared absorbing compound. Any near infrared black colorants may be used. In some examples, the fusing agent includes near infrared absorbing compound and an aqueous vehicle.

In some examples, the active material, or radiation absorbing agent, is a carbon back pigment or near infrared absorbing dyes. In some other examples, the active material, or radiation absorbing agent, is a carbon back pigment; and the fusing agent composition may be an ink formulation including carbon black as the active material. Examples of this ink formulation are commercially known as CM997A, 5206458, C18928, C93848, C93808, or the like, all of which are available from HP Inc. In yet some other examples, the fusing agent may be an ink formulation including near infrared absorbing dyes as the active material.

The fusing agent composition is an aqueous formulation (i.e., includes a balance of water) that may also include any of the previously listed co-solvents, non-ionic surfactants, biocides, and/or anti-kogation agents. The fusing agent composition includes an aqueous vehicle as defined above. In an example of the fusing agent composition, the co-solvents are present in an amount ranging from about 1 wt % to about 60 wt % of the total wt % of the fusing agent composition, the non-ionic surfactants are present in an amount ranging from about 0.5 wt. % to about 1.5 wt. % based on the total wt. % of the fusing agent composition, the biocides are present in an amount ranging from about 0.1 wt. % to about 5 wt. % based on the total wt. % of the fusing agent composition, and/or the anti-kogation agents are present in an amount ranging from about 0.1 wt. % to about 5 wt. % based on the total wt. % of the fusing agent composition. Some examples of the fusing agent composition may also include a pH adjuster, which is used to control the pH of the agent. From 0 wt % to about 2 wt % (of the total wt % of the fusing agent) of the pH adjuster, for example, can be used.

In an example, the active material is a near-infrared light absorber. Any near-infrared colorants, e.g., those produced by Fabricolor, Eastman Kodak, BASF, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc. Other suitable active materials include near-infrared absorbing dyes or plasmonic resonance absorbers.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

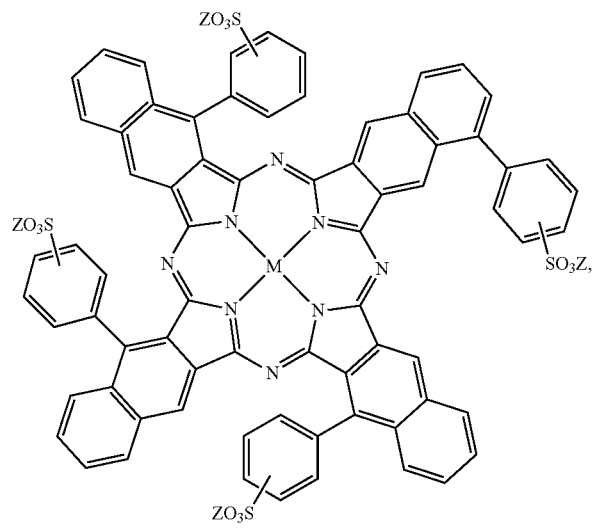
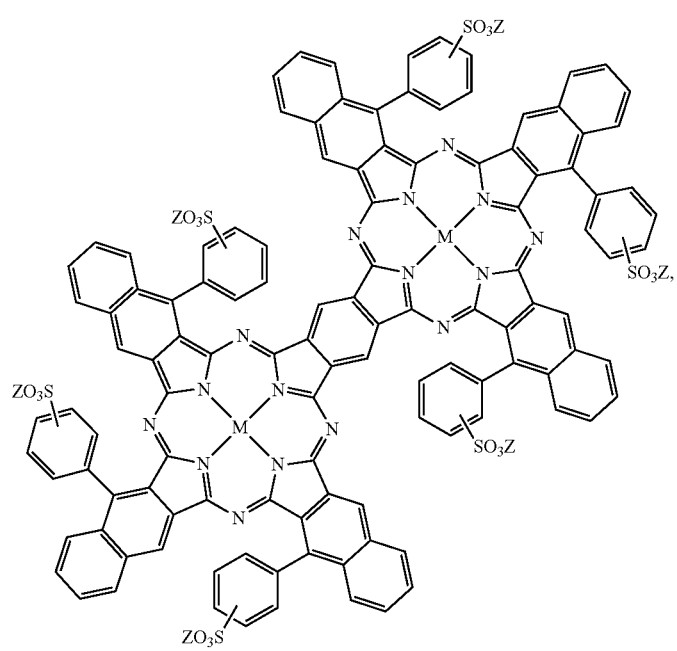

-continued

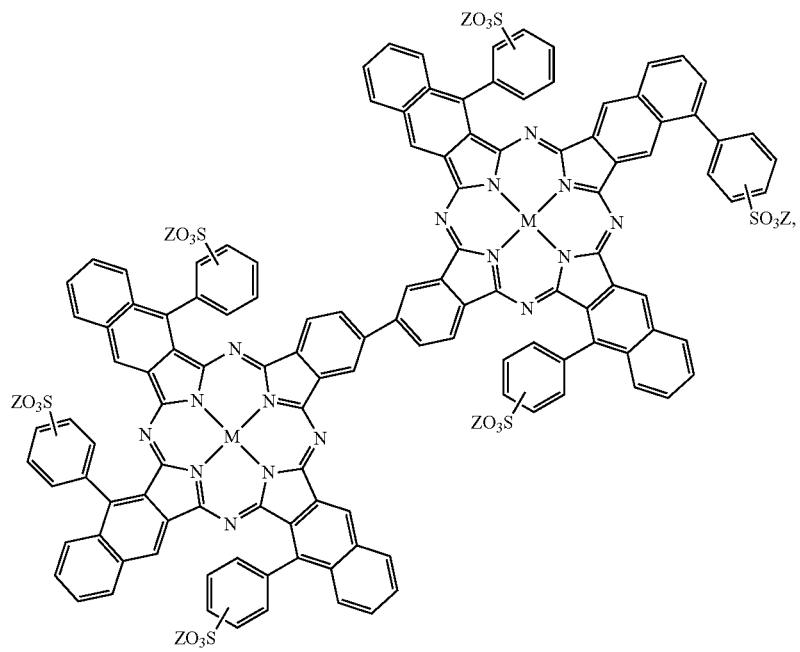

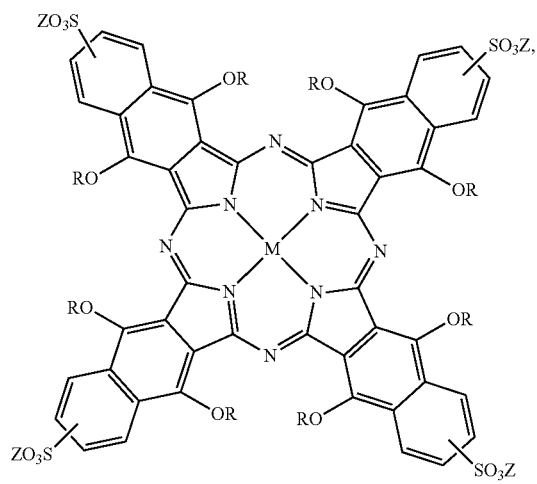

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

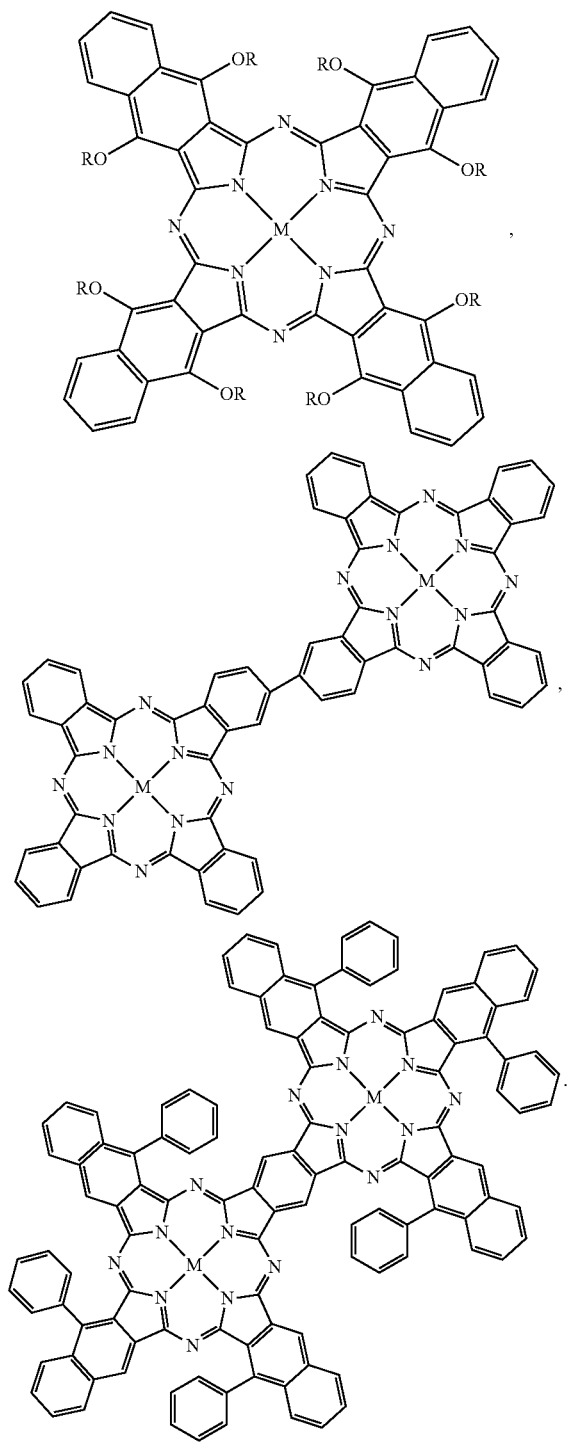

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

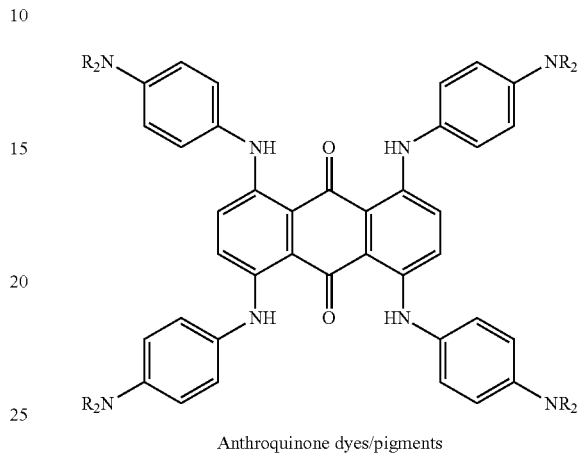

Anthroquinone dyes/pigments

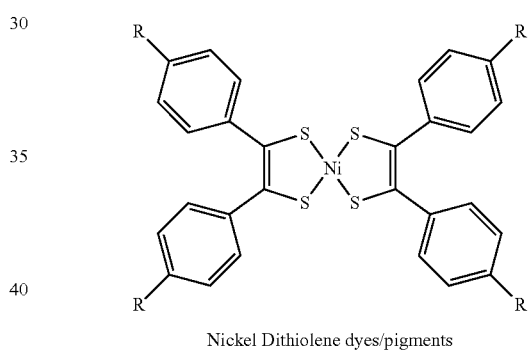

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

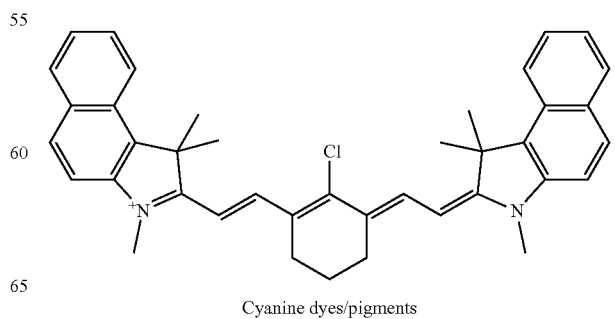

Cyanine dyes/pigments

-continued

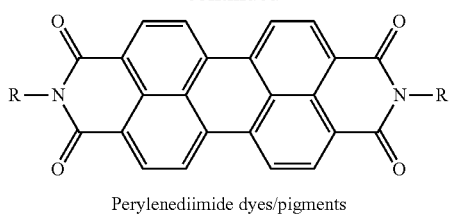

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrylium or thiopyrilium dyes or pigments may have the following structures, respectively:

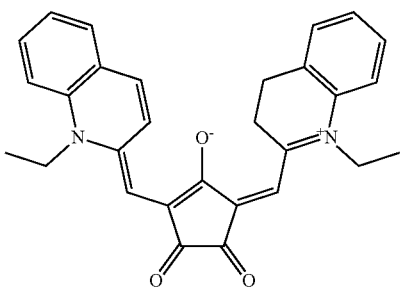

Croconium dyes/pigments

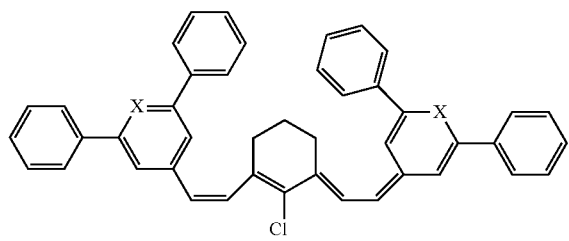

Pyrilium (X = O), thiopyrilium (X = S) dyes/pigments

Boron-dipyrromethene dyes or pigments and aza-boron-dipyrromethene dyes or pigments may have the following structures, respectively:

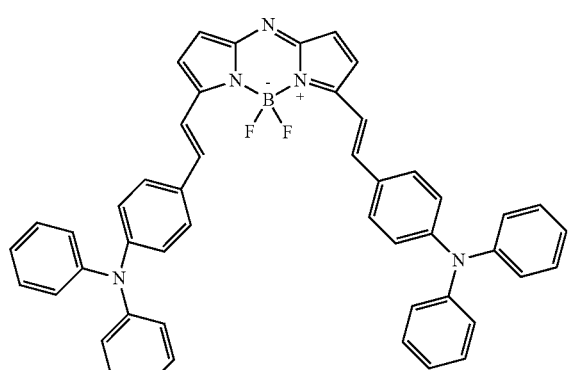

boron-dipyrromethene dyes/pigments

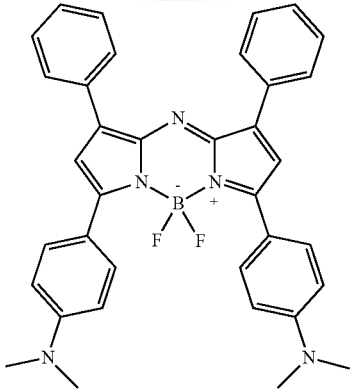

aza-boron-dipyrromethene dyes/pigments

In other examples, the active material may be a plasmonic resonance absorber. The plasmonic resonance absorber allows the fusing agent 26 to absorb radiation at wavelengths ranging from 800 nm to 4000 nm (e.g., at least 80% of radiation having wavelengths ranging from 800 nm to 4000 nm is absorbed), which enables the fusing agent 26 to convert enough radiation to thermal energy so that the build material 16 fuses/coalesces. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part to be white or slightly colored.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total weight of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or radiation absorbance efficiency.

As used herein, "FA vehicle" may refer to the liquid in which the active material is dispersed or dissolved to form the fusing agent 26. A wide variety of FA vehicles, including aqueous and non-aqueous vehicles, may be used in the fusing agent 26. In some examples, the FA vehicle may include water alone or a non-aqueous solvent alone with no other components. In other examples, the FA vehicle may include other components, depending, in part, upon the applicator 24 that is to be used to dispense the fusing agent 26. Examples of other suitable fusing agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL®671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent 26 may range from about 10 wt % to about 200 wt % based on the weight of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the weight of the plasmonic resonance absorber in the fusing agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The solvent of the fusing agent 26 may be water or a non-aqueous solvent (e.g., ethanol, acetone, n-methyl pyrrolidone, aliphatic hydrocarbons, etc.). In some examples, the fusing agent 26 consists of the active material and the solvent (without other components). In these examples, the solvent makes up the balance of the fusing agent 26.

Classes of organic co-solvents that may be used in a water-based fusing agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent 26 in a total amount ranging from about 1 wt % to about 50 wt % based upon the total weight of the fusing agent 26, depending upon the jetting architecture of the applicator 24. In an example, the total amount of the co-solvent(s) present in the fusing agent 26 is 25 wt % based on the total weight of the fusing agent 26.

The co-solvent(s) of the fusing agent 26 may depend, in part, upon the jetting technology that is to be used to dispense the fusing agent 26. For example, if thermal inkjet printheads are to be used, water and/or ethanol and/or other longer chain alcohols (e.g., pentanol) may be the solvent (i.e., makes up 35 wt % or more of the fusing agent 26) or co-solvents. For another example, if piezoelectric inkjet printheads are to be used, water may make up from about 25 wt % to about 30 wt % of the fusing agent 26, and the solvent (i.e., 35 wt % or more of the fusing agent 26) may be ethanol, isopropanol, acetone, etc. The co-solvent(s) of the fusing agent 26 may also depend, in part, upon the build material 16 that is being used with the fusing agent 26.

The FA vehicle may also include humectant(s). In an example, the total amount of the humectant(s) present in the fusing agent 26 ranges from about 3 wt % to about 10 wt %, based on the total weight of the fusing agent 26. An example of a suitable humectant is LIPONIC® EG-1 (i.e., LEG-1, glycereth-26, ethoxylated glycerol, available from Lipo Chemicals).

In some examples, the FA vehicle includes surfactant(s) to improve the jettability of the fusing agent 26. Examples of suitable surfactants include a self-emulsifiable, nonionic wetting agent based on acetylenic diol chemistry (e.g., SURFYNOL® SEF from Evonik Resources Efficiency GmbH), a nonionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Evonik Resources Efficiency GmbH) or an ethoxylated wetting agent and molecular defoamer (e.g., SURFYNOL® 420 from Evonik Resources Efficiency GmbH). Still other suitable surfactants include non-ionic wetting agents and molecular defoamers (e.g., SURFYNOL® 104E from Evonik Resources Efficiency GmbH) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.01 wt % to about 10 wt % based on the total weight of the fusing agent 26. In an example, the total amount of surfactant(s) in the fusing agent 26 may be about 3 wt % based on the total weight of the fusing agent 26.

An anti-kogation agent may be included in the fusing agent 26 that is to be jetted using thermal inkjet printing. Kogation refers to the deposit of dried printing liquid (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from greater than from about 0.20 wt % to about 0.65 wt % based on the total weight of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 26 may include a total amount of antimicrobial agents that ranges from about 0.05 wt % to about 1 wt %. In an example, the antimicrobial agent(s) is/are a biocide(s) and is/are present in the fusing agent 26 in an amount of about 0.25 wt % (based on the total weight of the fusing agent 26).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from greater than 0 wt % to about 2 wt % based on the total weight of the fusing agent 26. In an example, the chelating agent(s) is/are present in the fusing agent 26 in an amount of about 0.04 wt % (based on the total weight of the fusing agent 26).

Detailing Agents

In the examples of the method 200 and the system 10 disclosed herein, and as mentioned above, a detailing agent may be used. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent 26).

The surfactant(s) that may be used in the detailing agent include any of the surfactants listed above in reference to the fusing agent 26. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent 26. The total amount of co-solvent(s) in the detailing agent may range from about 1.00 wt % to about 20.00 wt % with respect to the total weight of the detailing agent.

Similar to the fusing agent 26, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye absorbs at least some wavelengths within the visible spectrum, but absorbs little or no wavelengths within the near-infrared spectrum. This is in contrast with the active material in the fusing agent 26, which absorbs wavelengths within the near-infrared spectrum. As such, the colorant in the detailing agent will not substantially absorb the fusing radiation, and thus will not initiate melting and fusing of the build material 16 in contact therewith when the build material layer 38 is exposed to the fusing radiation.

The dye selected as the colorant in the detailing agent may also have a high diffusivity (i.e., it may penetrate into greater than 10 μm and up to 100 μm of the build material composition particles 16). The high diffusivity enables the dye to penetrate into the build material composition particles 16 upon which the detailing agent is applied, and also enables the dye to spread into portions of the build material 16 that are adjacent to the portions of the build material 16 upon which the detailing agent is applied. The dye penetrates deep into the build material 16 particles to dye/color the composition particles. When the detailing agent is applied at or just outside the edge boundary (of the final 3D part), the build material 16 particles at the edge boundary may be colored. In some examples, at least some of these dyed build material 16 particles may be present at the edge(s) or surface(s) of the formed 3D layer or part, which prevents or reduces any patterns (due to the different colors of the fusing agent 26 and the build material 16) from forming at the edge(s) or surface(s).

The dye in the detailing agent may be selected so that its color matches the color of the active material in the fusing agent 26. As examples, the dye may be any azo dye having sodium or potassium counter ion(s) or any diazo (i.e., double azo) dye having sodium or potassium counter ion(s), where the color of azo or dye azo dye matches the color of the fusing agent 26.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

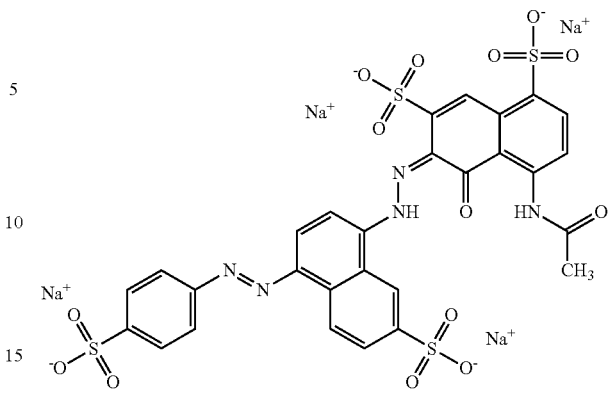

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

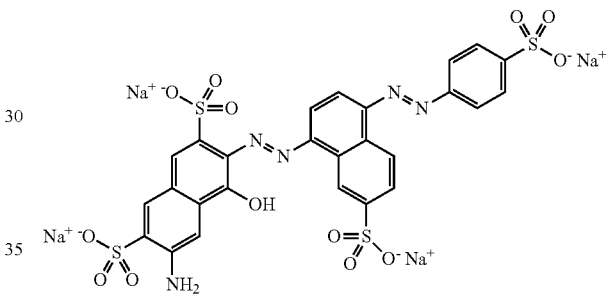

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

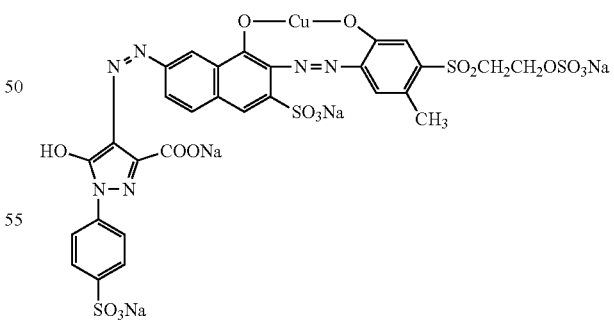

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

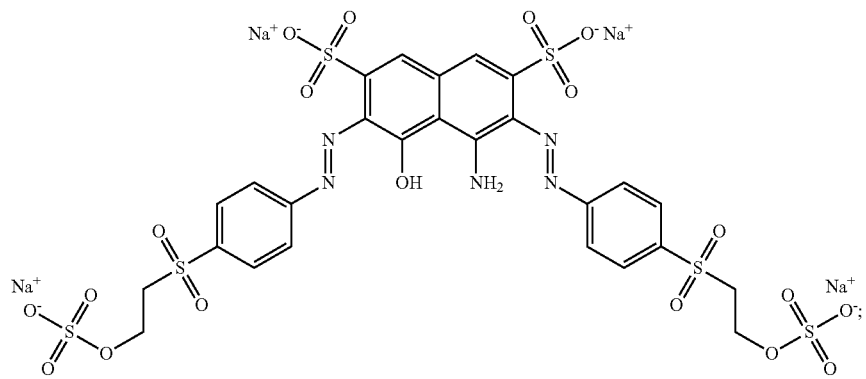

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

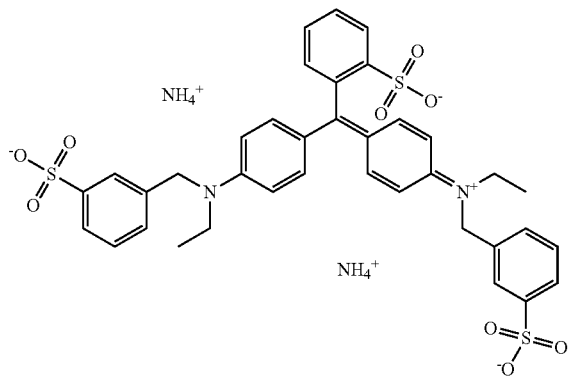

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

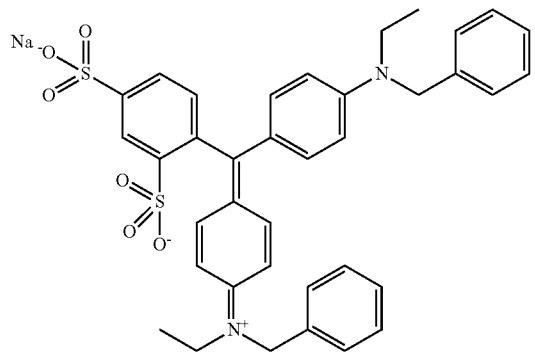

(commercially available as Acid Blue 7); and a phthalocyanine with a chemical structure of:

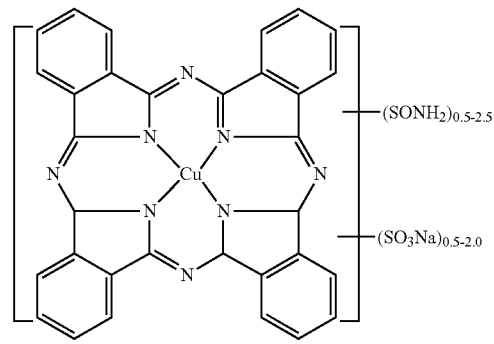

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

Coloring Agents

In the examples of the method 200, and the system 10 disclosed herein, and as mentioned above, a coloring agent may be used. The coloring agent may include a colorant, a surfactant, a co-solvent, and a balance of water. In some examples, the coloring agent consists of these components, and no other components. In some other examples, the coloring agent may further include additional components, such as dispersant(s), anti-kogation agent(s), antimicrobial agent(s), and/or chelating agent(s) (each of which is described above in reference to the fusing agent 26).

The coloring agent may be a black ink, a cyan ink, a magenta ink, or a yellow ink. As such, the colorant may be a black colorant, a cyan colorant, a magenta colorant, a yellow colorant, or a combination of colorants that together achieve a black, cyan, magenta, or yellow color.

In an example, the colorant may be present in the coloring agent in an amount ranging from about 0.1 wt % to about 10 wt % (based on the total weight of the coloring agent). In another example, the colorant may be present in the coloring agent in an amount ranging from about 0.5 wt % to about 5 wt % (based on the total weight of the coloring agent). In still another example, the colorant may be present in the coloring agent in an amount ranging from about 2 wt % to about 10 wt % (based on the total weight of the coloring agent).

In some examples, the colorant may be a dye. The dye may be non-ionic, cationic, anionic, or a combination thereof. Examples of dyes that may be used include Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include Direct Black 154, Direct Black 168, Fast Black 2, Direct Black 171, Direct Black 19, Acid Black 1, Acid Black 191, Mobay Black SP, and Acid Black 2. The dye may also be any of the examples listed in reference to the detailing agent.

In other examples, the colorant may be a pigment. As used herein, "pigment" may generally include organic and/or inorganic pigment colorants that introduce color to the coloring agent and the 3D printed part. The pigment can be self-dispersed with a polymer, oligomer, or small molecule or can be dispersed with a separate dispersant (described above in reference to the fusing agent 26).

Examples of pigments that may be used include Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140 (available from BASF Corp.). Examples of black pigments include Monarch® 1400, Monarch® 1300, Monarch® 1100, Monarch® 1000, Monarch® 900, Monarch® 880, Monarch® 800, and Monarch® 700 (available from Cabot Corp.). Other examples of pigments include Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B (available from CIBA). Still other examples of pigments include Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4 (available from Evonik). Yet other examples of pigments include Tipure® R-101 (available from DuPont), Dalamar® Yellow YT-858-D and Heucophthal Blue G XBT-583D (available from Heubach). Yet other examples of pigments include Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B (available from Clariant). Yet other examples of pigments include Quindo® Magenta, Indofast® Brilliant Scarlet, Quindo® Red R6700, Quindo® Red R6713, and Indofast® Violet (available from Mobay). Yet other examples of pigments include L74-1357 Yellow, L75-1331 Yellow, and L75-2577 Yellow, LHD9303 Black (available from Sun Chemical). Yet other examples of pigments include Raven® 7000, Raven® 5750, Raven® 5250, Raven® 5000, and Raven® 3500 (available from Columbian).

When the coloring agent is applied at or just outside the edge boundary (of the final 3D part), the build material 16 at the edge boundary may be colored. In some examples, at least some of these dyed build material 16 particles may be present at the edge(s) or surface(s) of the formed 3D layer or part, which prevents or reduces any patterns (due to the different colors of the fusing agent 26 and the build material 16) from forming at the edge(s) or surface(s).

The surfactant(s) that may be used in the coloring agent include any of the surfactants listed above in reference to the fusing agent 26. The total amount of surfactant(s) in the coloring agent may range from about 0.01 wt % to about 20 wt % with respect to the total weight of the coloring agent. In an example, the total amount of surfactant(s) in the coloring agent may range from about 5 wt % to about 20 wt % with respect to the total weight of the coloring agent.

The co-solvent(s) that may be used in the coloring agent include any of the co-solvents listed above in reference to the fusing agent 26. The total amount of co-solvent(s) in the coloring agent may range from about 1 wt % to about 50 wt % with respect to the total weight of the coloring agent.

Similar to the fusing agent 26 and the detailing agent, the co-solvent(s) of the coloring agent may depend, in part upon the jetting technology that is to be used to dispense the coloring agent. For example, if thermal inkjet printheads are to be used, water and/or ethanol and/or other longer chain alcohols (e.g., pentanol) may make up 35 wt % or more of the coloring agent. For another example, if piezoelectric inkjet printheads are to be used, water may make up from about 25 wt % to about 30 wt % of the coloring agent, and 35 wt % or more of the coloring agent may be ethanol, isopropanol, acetone, etc.

The balance of the coloring agent is water. As such, the amount of water may vary depending upon the amounts of the other components that are included.

In some examples, the coloring agent can include a colorant, a dispersant/dispersing additive, a co-solvent, and water. The coloring agent is a water-based inkjet composition. In some instances, the coloring agent includes these components and no other components. In other instances, the coloring agent may further include an anti-kogation agent, a biocide, a binder, and combinations thereof.

The colorant of the coloring agent is a pigment and/or dye having a color other than white. Examples of the other colors include cyan, magenta, yellow, black, etc. In some instances, the colorant of the colored ink may also be transparent to infrared wavelengths. Examples of IR transparent colorants include acid yellow 23 (AY 23), AY17, acid red 52 (AR 52), AR 289, and reactive red 180 (RR 180). In other instances, the colorant of the coloring agent may not be completely transparent to infrared wavelengths, but does not absorb enough radiation to sufficiently heat the build material particles in contact therewith. For example, the colorant of the coloring agent may absorb some visible wavelengths and some IR wavelengths. Some examples of these colorants include cyan colorants, such as direct blue 199 (DB 199) and pigment blue 15:3 (PB 15:3).

The coloring agent also includes the dispersing additive, which helps to uniformly distribute the colorant throughout the coloring agent and aid in the wetting of the ink 230 onto the build material particles. Any of the dispersing additives discussed herein for the fusing agent may be used in the coloring agent. The dispersing additive may be present in the coloring agent in a similar amount as the colorant.

In addition to the non-white colorant and the dispersing additives, the coloring agent may include similar components as the fusing agent (e.g., co-solvent(s), anti-kogation agent(s), biocide(s), water, etc.). The coloring agent may also include a binder, such as an acrylic latex binder, which may be a copolymer of any two or more of styrene, acrylic acid, methacrylic acid, methyl methacrylate, ethyl methacrylate, and butyl methacrylate. Some examples of the coloring agent may also include other additives, such as a humectant and lubricant (e.g., Liponic® EG-1 (LEG-1) from Lipo Chemicals), a chelating agent (e.g., disodium ethylene diamine-tetraacetic acid (EDTA-Na)), and/or a buffer.

An example of the pigment based coloring agent may include from about 1 wt % to about 10 wt % of pigment(s), from about 10 wt % to about 30 wt % of co-solvent(s), from about 1 wt % to about 10 wt % of dispersing additive(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersing additive(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water.

In some examples, the coloring agent includes cyan ink composition (C), yellow ink composition (Y), magenta ink composition (M), and black ink composition (K). In some examples, additional ink compositions may be used in addition to the CYMK coloring agent.

The colorant(s) in the coloring agent(s) described herein can include inorganic pigments, organic pigments, dyes, and combinations thereof.

The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

In some examples, the coloring agent includes cyan ink, yellow ink, magenta ink, and black ink.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the BLACK PEARLS® series, REGAL® series, the MOGUL® series, or the MONARCH® series manufactured by Cabot Corporation, Boston, Mass., (such as, e.g., BLACK PEARLS® 880 Carbon Black, REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

In some examples, the above pigments can be used alone or in any combination with one another.

The total amount of the colorant(s) in the coloring agent(s) ranges from about 0.1 wt % to about 15 wt % based on the total weight of the coloring agent(s). In some examples, the total amount of the colorant(s) in the coloring agent(s) ranges from about 1 wt % to about 8 wt % based on the total weight of the coloring agent(s).

In some examples, the average particle size of these colorant(s) may range from about 80 nm to about 400 nm.

In some examples, the above-described colorant(s) can be dispersed into a polymeric dispersion. In some examples, the colorant(s) (e.g., pigment(s)) can be dispersed in a dispersion comprising a styrene acrylic polymer. The polymeric dispersion comprising a styrene acrylic polymer can assist in dispersing the pigment in a solvent system.

A variety of styrene acrylic polymers can be used for the pigment dispersion. Some non-limiting commercial examples of useful styrene acrylic polymers are sold under the trade names JONCRYL® (S.C. Johnson Co.), UCAR™ (Dow Chemical Co.), JONREZ® (MeadWestvaco Corp.), and VANCRYL® (Evonik Resources Efficiency GmbH).

In further detail, the styrene acrylic polymer can be formulated with a variety of monomers, such as hydrophilic monomers, hydrophobic monomers, or combinations thereof. Non-limiting examples of hydrophilic monomers that can be co-polymerized together to form the styrene acrylic polymer include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, the like, or combinations thereof.

Non-limiting examples of hydrophobic monomers that can be used include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, the like, or combinations thereof.

The styrene acrylic polymer can have a weight average molecular weight (Mw) from about 3,000 g/mol to about 30,000 g/mol. In yet other examples, the styrene acrylic polymer can have an Mw from about 4,000 g/mol to about 25,000 g/mol, or from about 4,500 g/mol to about 22,000 g/mol.

In each instance where molecular weight is referred to, it is to be understood that this refers to weight average molecular weight in g/mol.

Further, in some examples, the styrene acrylic polymer can have an acid number or acid value from about 120 mg KOH/g to about 300 mg KOH/g. In yet other examples, the styrene acrylic polymer can have an acid number from about 140 mg KOH/g to about 260 mg KOH/g, from about 160 mg KOH/g to about 240 mg KOH/g, or from about 180 mg KOH/g to about 230 mg KOH/g. An acid number can be defined as the number of milligrams of potassium hydroxide to neutralize 1 gram of the substance.

In some examples, the amount of styrene acrylic polymer in the coloring agent(s) can be from about 0.1 wt % to about 20 wt % based on the total weight of the coloring agent(s), or from about 0.5 wt % to about 10 wt % based on the total weight of the coloring agent(s), or from about 1 wt % to about 5 wt % based on the total weight of the coloring agent(s).

In some examples, the amount of styrene acrylic polymer in the coloring agent(s) can be based on the amount of the colorant(s) in the coloring agent(s). Thus, in some examples, the colorant(s) and the styrene acrylic polymer can be present in the coloring agent(s) at a particular weight ratio.

In some specific examples, the pigment and styrene acrylic polymer can be present at a weight ratio of from 1:1 to 10:1. In other examples, the pigment and the styrene acrylic polymer can be present at a weight ratio of from about 2:1 to about 10:1. In yet other examples, the pigment and the styrene acrylic polymer can be present at a weight ratio of from about 3:1 to about 6:1.

Surface Modifying Agents/Surfactants for Fusing and/or Detailing Agent

Surface modifying agent(s) or surfactant(s) (used interchangeably herein) may be used to improve the wetting properties and the jettability of the fusing agent and/or the detailing agent (also referred to herein as agent). Examples of suitable surfactants may include a self-emulsifiable, non-ionic wetting agent based on acetylenic diol chemistry, a nonionic fluorosurfactant, and combinations thereof. In other examples, the surfactant may be an ethoxylated low-foam wetting agent or an ethoxylated wetting agent and molecular defoamer. Still other suitable surfactants include non-ionic wetting agents and molecular defoamers or water-soluble, non-ionic surfactants. In some examples, it may be desirable to utilize a surfactant having a hydrophilic-lipophilic balance (HLB) less than 10. Whether a single surfactant is used or a combination of surfactants is used, the total amount of surfactant(s) in the agent may range from about 0.1 wt % to about 3 wt % based on the total wt % of the agent.

In some examples, the other surfactants can include wetting agent(s) and/or surface tension reducing agent(s).

Examples of suitable wetting agents can include non-ionic surfactants. Some specific examples include a self-emulsifiable, non-ionic wetting agent based on acetylenic diol chemistry (e.g., SURFYNOL® SEF from Evonik Resources Efficiency GmbH), a non-ionic fluorosurfactant (e.g., CAPSTONE® fluorosurfactants from DuPont, previously referred as ZONYL FSO), and combinations thereof. In other examples, the wetting agent is an ethoxylated low-foam wetting agent (e.g., SURFYNOL® 440 or SURFYNOL® CT-111 from Evonik Resources Efficiency GmbH) or an ethoxylated wetting agent and molecular defoamer (e.g., SURFYNOL® 420 from Evonik Resources Efficiency GmbH). Still other suitable wetting agents include non-ionic wetting agents and molecular defoamers (e.g., SURFYNOL® 104E from Evonik Resources Efficiency GmbH) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be appropriate to utilize a wetting agent having a hydrophilic-lipophilic balance (HLB) less than 10.

In some examples, wetting agent(s) may be present in the fusing agent(s) and/or detailing agent(s) in an amount ranging from about 0.1 wt % to about 4 wt % of the total weight of the compositions/agents. In an example, the amount of the wetting agent(s) present in the compositions/agents is about 0.1 wt % based on the total weight of the compositions/agents. In another example, the amount of the wetting agent(s) present in the compositions/agents is about 0.04 wt % based on the total weight of the compositions/agents.

The fusing agent(s) and/or detailing agent(s) may also include surface tension reduction agent(s). Any of the previously mentioned wetting agents/surfactants may be used to reduce the surface tension. As an example, the surface tension reduction agent may be the self-emulsifiable, non-ionic wetting agent based on acetylenic diol chemistry (e.g., SURFYNOL® SEF from Evonik Resources Efficiency GmbH).

The surface tension reduction agent(s) may be present in the compositions/agents in an amount ranging from about 0.1 wt % to about 4 wt % of the total weight of the compositions/agents. In an example, the amount of the surface tension reduction agent(s) present in the compositions/agents is about 1.5 wt % based on the total weight of the compositions/agents. In another example, the amount of the surface tension reduction agent(s) present in the compositions/agents is about 0.6 wt % compositions/agents.

When a surfactant is both a wetting agent and a surface tension reduction agent, any of the ranges presented herein for the wetting agent and the surface tension reduction agent may be used for the surfactant.

Other Additives in Fusing/Detailing Agents

In some examples, the fusing agent and/or the detailing agent may further include a buffer solution, a surfactant, a dispersant, an anti-kogation agent, a dispersing additive, a biocide, a chelating agent, at least one chelating agent, and combinations thereof.

In some examples, the fusing agent and/or the detailing agent may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5.

In some examples, the buffer solution(s) can be added to the fusing agent and/or the detailing agent in amounts ranging from about 0.01 wt % to about 20 wt %, or from 0.1 wt % to about 15 wt %, or from about 0.1 wt % to about 10 wt % based on the total weight of the agent(s)/composition(s).

In some examples, the buffer solution(s) can include at least one poly-hydroxy functional amine.

In some examples, the buffer solution(s) can be 2-[4-(2-hydroxyethyl) piperazin-1-yl] ethane sulfonic acid, 2-amino-2-(hydroxymethyl)-1,3-propanediol (TRIZMA® sold by Sigma-Aldrich), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof.

In some examples, the buffer solution(s) can be 2-amino-2-(hydroxymethyl)-1,3-propanediol (TRIZMA® sold by Sigma-Aldrich), beta-alanine, betaine, or mixtures thereof.

The fusing agent and/or the detailing agent in some examples can be dispersed with a dispersing additive. The dispersing additive can help to uniformly distribute colorant(s) throughout the agent(s)/composition(s). The dispersing additive may also aid in the wetting of the agent(s)/composition(s) onto any other applied agent(s)/composition(s) and/or the layer(s) of the build material.

The dispersing additive may be present in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

Some examples of the dispersing additive can include a water soluble acrylic acid polymer (e.g., CARBOSPERSE® K7028 available from Lubrizol), a high molecular weight block copolymer with pigment affinic groups (e.g., DISPERBYK®-190 available BYK Additives and Instruments), and combinations thereof.

The dispersant can provide particular wetting properties when applied to the layer(s) of the build material. The dispersant can help uniformly distribute the ink(s) on the layer(s) of the build material.

The dispersant may be present in an amount ranging from about 0.01 wt % to about 2 wt % based on the total weight of fusing agent and/or the detailing agent, or less than about 1.5 wt %, or less than about 1 wt %, or at least 0.01 wt %, or at least 0.1 wt %, or at least about 0.5 wt %.

The dispersant may be non-ionic, cationic, anionic, or combinations thereof. Some examples of the dispersant include a self-emulsifiable, non-ionic wetting agent based on acetylenic diol chemistry (e.g., SURFYNOL® SEF from Evonik Resources Efficiency GmbH), an ethoxylated low-foam wetting agent (e.g., SURFYNOL® 440 and SURFYNOL® 465 from Evonik Resources Efficiency GmbH), a non-ionic acetylenic diol surface active agent (e.g., SURFYNOL® 104 from Evonik Resources Efficiency GmbH), a non-ionic, alkylphenylethoxylate and solvent free surfactant blend (e.g., SURFYNOL® CT-211 from Evonik Resources Efficiency GmbH), a non-ionic organic surfactant (e.g., TEGO® Wet 510 from Evonik Industries AG), a non-ionic fluorosurfactant (e.g., CAPSTONE® fluorosurfactants from DuPont, previously known as ZONYL FSO, POLYFOX™ PF-154N from Omnova Solutions Inc.), non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company), a water-soluble non-ionic surfactant (e.g., TERGITOL® TMN-6), and combinations thereof. Examples of anionic dispersants include those in the DOWFAX™ family (from Dow Chemical Company), and examples of cationic dispersants include dodecyltrimethylammonium chloride and hexadecyldimethylammonium chloride. Combinations of any of the previously listed dispersants may also be used.

Examples of anti-kogation agents include oleth-3-phosphate or polyoxyethyene (3) oleyl mono/di-phosphate (e.g., Crodafos® N-3A from Croda, now Crodafos® O3A), aqueous dispersion of fumed alumina or fumed silica (e.g., CAB-O-SPERSE® from Cabot Corp.), a metal chelator/chelating agent, such as methylglycinediacetic acid (e.g., Trilon® M from BASF Corp.), and combinations thereof.

The anti-kogation agents may be present in the fusing agent and/or the detailing agent in an amount ranging from about 0.01 wt % to about 2 wt % based on the total weight of the fusing agent and/or the detailing agent(s)/composition (s), or less than about 1.5 wt %, or less than about 1 wt %, or at least 0.01 wt %, or at least about 0.1 wt %, or at least about 0.5 wt %.

Examples of biocides include 1,2-benzisothiazolin-3-one as the active ingredient in ACTICIDE® B-20 (available from Thor GmbH), 2-methyl-4-isothiazolin-3-one as the active ingredient in ACTICIDE® M-20 (available from Thor GmbH), an aqueous solution of 1,2-benzisothiazolin-3-one (e.g., PROXEL® GXL from Arch Chemicals, Inc.), quaternary ammonium compounds (e.g., Bardac® 2250 and 2280, Barquat® 50-65B, and Carboquat® 250-T, all from Lonza Ltd. Corp.), an aqueous solution of methylisothiazolone (e.g., Kordek® MLX from The Dow Chemical Co.), and combinations thereof.

The biocides may be present in the agent(s)/composition(s) in an amount ranging from about 0.01 wt % to about 2 wt % based on the total weight of the agent(s)/composition(s), or less than about 1.5 wt %, or less than about 1 wt %, or at least 0.01 wt %, or at least about 0.1 wt %, or at least about 0.5 wt %.

The fusing agent and/or the detailing agent may also include a binder or other additives, such as a humectant and lubricant (e.g., LIPONIC® EG-1 (LEG-1) from Lipo Chemicals) or a chelating agent (e.g., disodium ethylenediaminetetraacetic acid (EDTA-Na)).

The amounts of the above additives can total up to about 20 wt % based on the total weight of one of the fusing agent and/or the detailing agent.

Co-Solvent(s)

In some examples, each of the agent(s) (e.g. fusing agent and/or detailing agent) described herein can include at least one co-solvent. The co-solvent can be present in an amount ranging from about 0.1 wt % to about 50 wt % based on the total weight of each of the agent(s)/composition(s), or less than about 60 wt %, or less than about 50 wt %, or less than about 45 wt %, or less than about 40 wt %, or less than about 35 wt %, or less than about 30 wt %, or less than about 25 wt %, or less than about 20 wt %, or less than about 15 wt %, or less than about 10 wt %, or less than about 5 wt %, or at least about 10 wt %, or at least about 15 wt %, or at least about 20 wt %, or at least about 25 wt %, or at least about 30 wt %, or at least about 35 wt %, or at least about 40 wt %, or at least about 45 wt %, or at least about 50 wt %.

Some examples of co-solvents can include 2-pyrrolidinone, hydroxyethyl-2-pyrrolidone, diethylene glycol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

Water

The balance of the agent(s) (e.g. fusing agent and/or detailing agent) may be water. As such, the amount of water may vary depending upon the amounts of the nanoparticle (s), near infrared absorbing compound(s), and colorant(s).

In some examples, water can be present in the agent(s) in amounts greater than about 50 wt % based on the total weight of the agent(s)/composition(s). In some examples, the water can be present in the agent(s)/composition(s) in amounts from about 50 wt % to about 90 wt % based on the total weight of the agent(s)/composition(s). In other examples, the agent(s)/composition(s) can include water in an amount of from about 60 wt % to about 90 wt % based on the total weight of the agent(s)/composition(s). In further examples, the agent(s)/composition(s) can include from about 70 wt % to about 85 wt % water. While several examples have been described in detail, it is to be understood that the disclosed examples may be modified. Therefore, the foregoing description is to be considered non-limiting.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

The invention claimed is:

1. A build material for 3D printing, said build material comprising polymeric particles comprising polypropylene and at least one elastomer, wherein the polymeric particles comprise a surface-active coating and wherein said build material is dispersed in a matrix comprising polypropylene, wherein the at least one elastomer is present in an amount of about 3 to about 50 weight % based on a total weight of the polymeric particles, and wherein the polypropylene comprises a block copolymer of propylene and comonomer selected from a C2 or C4-8 olefin.

2. The build material as claimed in claim 1, wherein the polymeric particles comprise:
   composite polymeric particles comprising the polypropylene and the at least one elastomer.

3. The build material as claimed in claim 1, wherein the comonomer is selected from ethylene, 1-hexene and/or butadiene.

4. The build material as claimed in claim 1, wherein the block copolymer is a copolymer of propylene and 5 to 20 weight % of the comonomer.

5. The build material as claimed in claim 1, wherein the surface-active coating comprises a surfactant or an acidic polymer.

6. The build material as claimed in claim 1, wherein the polymeric particles have the following particle size distribution particles have the following particle size distribution: D50 is from 45 μm to 70 μm, D10 is from 20 μm to 50 μm, and D90 is from 75 μm to 120 μm.

7. A three-dimensional printing kit comprising
   a fusing agent comprising at least one infrared absorbing compound, and
   a build material for 3D printing, said build material comprising polymeric particles comprising polypropylene and at least one elastomer, wherein the polymeric particles comprise a surface-active coating and wherein said build material is dispersed in a matrix comprising polypropylene, wherein the at least one elastomer is present in an amount of about 3 to about 50 weight % based on the total weight of the composite polymeric particles, and wherein the polypropylene comprises a block copolymer of propylene and comonomer selected from a C2 or C4-8 olefin.

* * * * *